(12) United States Patent
Eichel et al.

(10) Patent No.: US 10,685,750 B2
(45) Date of Patent: Jun. 16, 2020

(54) FISSION PRODUCT GETTER

(71) Applicant: TerraPower, LLC, Bellevue, WA (US)

(72) Inventors: Daniel Eichel, Redmond, WA (US); James M. Vollmer, Kirkland, WA (US)

(73) Assignee: TERRAPOWER, LLC., Bellevue, WA (US)

( * ) Notice: Subject to any disclaimer, the term of this patent is extended or adjusted under 35 U.S.C. 154(b) by 359 days.

(21) Appl. No.: 15/451,719

(22) Filed: Mar. 7, 2017

(65) Prior Publication Data
US 2017/0263339 A1 Sep. 14, 2017

Related U.S. Application Data

(60) Provisional application No. 62/305,272, filed on Mar. 8, 2016.

(51) Int. Cl.
*G21C 3/17* (2006.01)
*G21C 3/18* (2006.01)
*G21C 3/32* (2006.01)

(52) U.S. Cl.
CPC .............. *G21C 3/17* (2013.01); *G21C 3/18* (2013.01); *G21C 3/32* (2013.01); *Y02E 30/40* (2013.01)

(58) Field of Classification Search
CPC ... G21C 3/17; G21C 3/18; G21C 3/32; G21C 21/00
USPC .................................................. 376/313, 418
See application file for complete search history.

(56) References Cited

U.S. PATENT DOCUMENTS

| | | | |
|---|---|---|---|
| 3,993,453 A | 11/1976 | Ross et al. | |
| 4,119,488 A * | 10/1978 | Barosi | G21C 3/17 376/418 |
| 4,131,511 A | 12/1978 | Mordarski et al. | |
| 4,257,847 A | 3/1981 | Gibby et al. | |
| 4,853,177 A * | 8/1989 | Pettus | G21C 3/18 376/418 |
| 6,602,919 B1 | 8/2003 | Collins | |
| 2013/0010915 A1 | 1/2013 | Garnier et al. | |

FOREIGN PATENT DOCUMENTS

| | | |
|---|---|---|
| EP | 0508715 A1 | 10/1992 |
| GB | 2031216 A | 4/1980 |
| GB | 2183893 A | 6/1987 |

OTHER PUBLICATIONS

*Processing Routes to Macroporous Ceramics: A Review* J. Am. Ceram. Soc. 89 [6], pp. 1771-1789 (2006).
PCT/US2017/021125 International Search Report and Written Opinion dated Nov. 21, 2017.

* cited by examiner

*Primary Examiner* — Jack W Keith
*Assistant Examiner* — Daniel Wasil
(74) *Attorney, Agent, or Firm* — Jeremy P. Sanders

(57) ABSTRACT

A getter element includes a getter material reactive with a fission product contained within a stream of liquid and/or gas exiting a fuel assembly of a nuclear reactor. At least one transmission pathway passes through the getter element that is sufficiently sized to maintain a flow of the input stream through the getter element at above a selected flow level. At least one transmission pathway includes a reaction surface area sufficient to uptake a pre-identified quantity of the fission product.

19 Claims, 25 Drawing Sheets

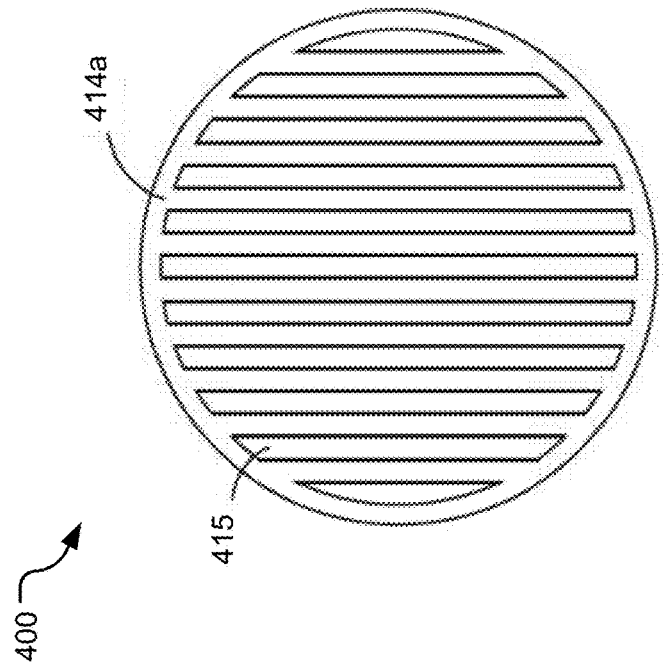
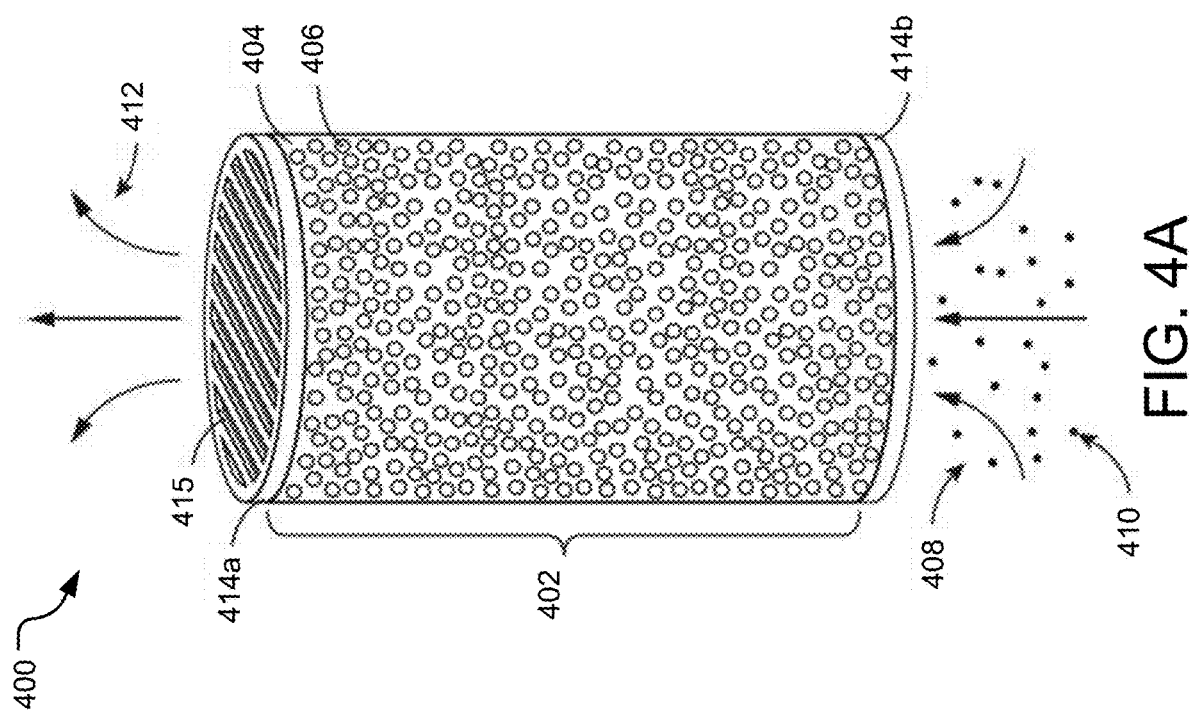
FIG. 4B
FIG. 4A

FISSION PRODUCT GETTER

CROSS-REFERENCE TO RELATED APPLICATIONS

The present application claims benefit of priority to U.S. Provisional Patent Application No. 62/305,272, entitled "Fission Product Getter" and filed on Mar. 8, 2016, which is specifically incorporated by reference herein for all that it discloses or teaches.

TECHNICAL FIELD

The present disclosure generally relates to a fission product getter device and a method of fabricating a fission product getter device.

SUMMARY

A fission product getter apparatus is disclosed, in accordance with one or more illustrative embodiments of the present disclosure. In one illustrative embodiment, the fission product getter apparatus includes a getter body including a volume of getter material and having a void structure. In another illustrative embodiment, the getter material is reactive with a nuclear fission product contained within a fluid flow from a nuclear fission reactor. In another illustrative embodiment, the getter body has a determined volume parameter sufficient to maintain flow of the fluid through the void structure of the getter body for a selected period of time. In another illustrative embodiment, the determined volume parameter of the getter body has the determined volume parameter and provides a void volume within the getter body sufficient to maintain expansion of the getter body below a selected expansion threshold over a selected period of time.

The foregoing is a summary and thus may contain simplifications, generalizations, inclusions, and/or omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

BRIEF DESCRIPTION OF THE DRAWINGS

FIG. 4A illustrates another example getter element including a getter body supported by capping elements.

FIG. 4B illustrates another view of one of the capping elements illustrated in FIG. 4A.

DETAILED DESCRIPTION

Figure 1:
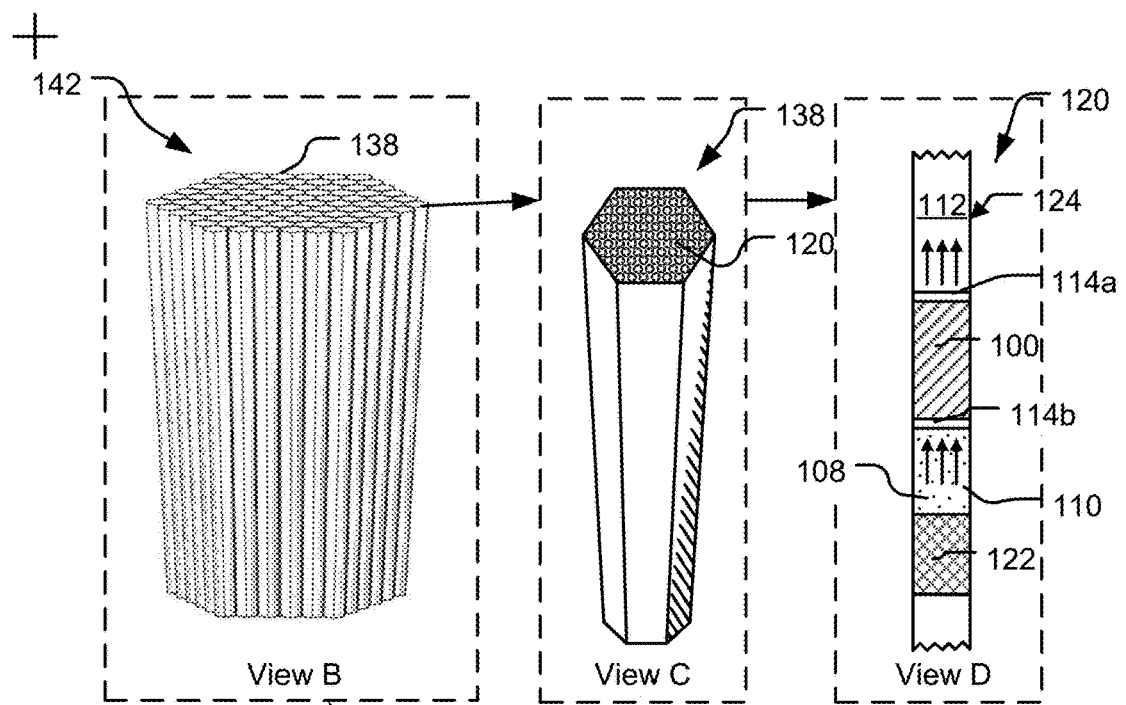
FIG. 1 illustrates an example nuclear fission reactor with a fast nuclear reactor core.
Figure 1:
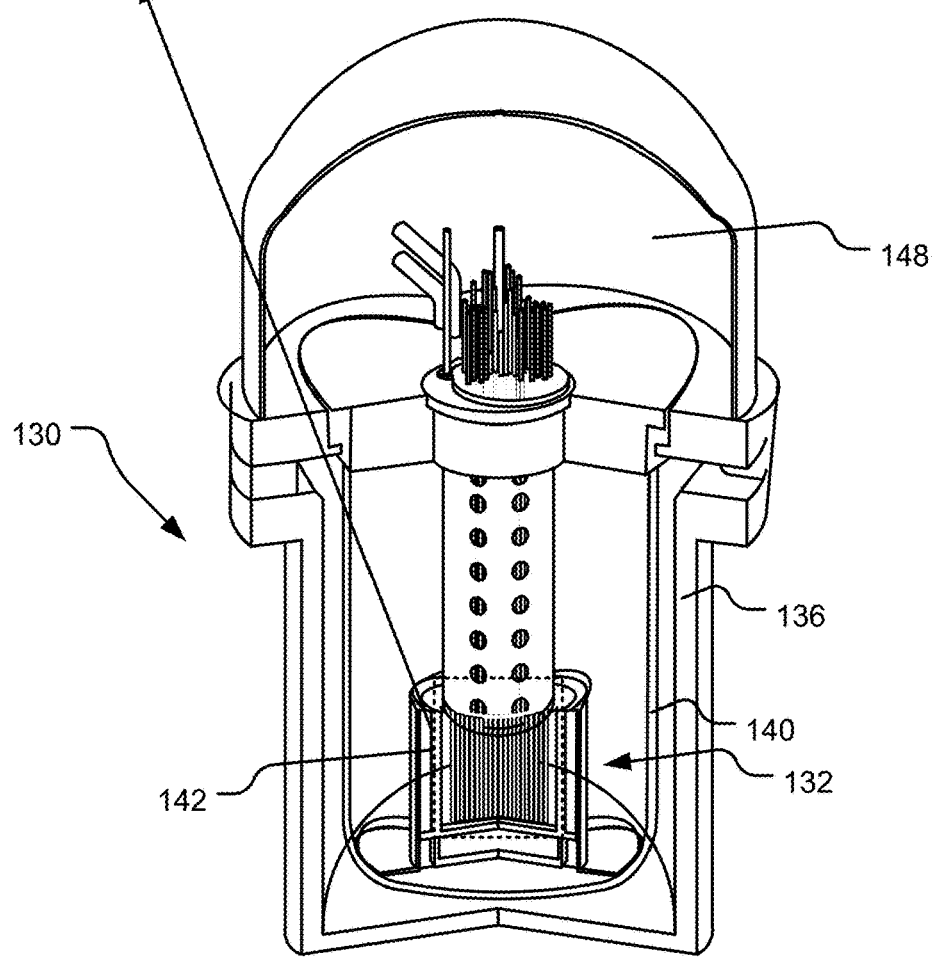

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present disclosure is directed to various embodiments of a getter element for removing one or more fission products from a gas and/or liquid flow, such as fission products formed during a reaction process within a nuclear fuel of a nuclear reactor. The getter element includes one or more internal passages that facilitate a continuous through-put of the fluid (liquid and/or gas) flow, and also includes getter material that chemically reacts with a target fission product to remove the fission product from the flow. The disclosed technology is suitable for implementation in a variety of nuclear reactors including without limitation fast nuclear reactors, breeder reactors, breed and burn reactors, and/or in some cases traveling wave reactors. The present disclosure is further directed to various methods of forming the getter element.

FIG. 1 illustrates an example nuclear fission reactor 130 with a fast nuclear reactor core 132. The fast nuclear reactor core 132 is disposed in a reactor vessel 140 surrounded by a guard vessel 136. In one implementation, the fast nuclear reactor core 132 includes a nuclear fission igniter (not shown) that provides neutrons for the fission reaction of fissile nuclear fuel. The nuclear fission reactor 130 includes a number of fuel assemblies (e.g., a fuel assembly 138 in View B), and each fuel assembly further includes multiple fuel elements, which are also referred to herein as fuel pins. In one implementation of the disclosed technology, the individual fuel pins each further include a mechanism for collecting one or more fission products from an input stream, as described below with reference to Views B, C, and D.

The fast nuclear reactor core 132 typically contains a coolant, such as a pool of coolant (such as liquid sodium) or loops through which coolant may flow throughout the nuclear fission reactor 139. In some reactors, there exists a reservoir of coolant in headspace 148 above the fast nuclear reactor core 132. Heat exchangers (not shown) may rest near or in contact with the reservoir of coolant to aid in transporting heat away from the fast nuclear reactor core 132.

Referring to View A, the nuclear fission reactor 130 includes a number of fuel assemblies shown in greater detail in View B (e.g., the fuel assembly 138). Each fuel assembly further includes multiple fuel pins, such as a fuel pin 120 (shown in View C). View B illustrates an array 142 of nuclear fuel assembly devices suitable for use within the fast nuclear reactor core 132. Each assembly includes multiple fuel pins (e.g., a fuel pin 120). Although other device shapes and array configurations are contemplated, the example nuclear fuel assembly devices of FIG. 1 each include a solid hexagonal tube surrounding. Non-hexagonal tubes may also be used on some implementations. Components of an individual fuel assembly device 138 within the array 142 are shown in further detail in Views C and D.

As shown in View C, the nuclear fuel assembly device 138 surrounds a plurality of elongated fuel elements, such as the fuel pin 120. When nuclear fission occurs within a fuel pin, fission products are created that can contribute to a building pressure within the pin. In some reactors, fuel pins are designed to include a large plenum area to accommodate this pressure at high burn-ups. Other reactors may include fuel pins designed to vent gases to relieve pressure, such as venting to allow the fission products to flow into contact with a coolant reservoir in the headspace 148. Since some fission products may be volatile, this venting can pose a risk.

Both venting and non-venting fuel pin designs can benefit from the herein-disclosed technology, which generally provides tools and techniques for removing of one or more fission products from a fluid flow within the nuclear fission reactor 130.

Components of the fuel pin 120 are shown in greater detail in View D, described below. In one implementation, the tubular structure of each of the individual fuel assembly devices, such as the nuclear fuel assembly device 138, allows coolant to flow past the fuel pins through interstitial gaps between adjacent tube walls. Each tube also allows individual assembly orificing, provides structural support for the fuel bundle, and transmits handling loads from a handling socket to an inlet nozzle. Fuel pins typically consist of multiple nuclear fuel rods (such as uranium, plutonium or thorium) surrounded by cladding (and sometimes an additional barrier and/or liner) to separate the radiative material and the coolant stream. Individual pins of the nuclear fuel assembly devices 138 in the fast nuclear reactor core 132 can contain fissile nuclear fuel and/or fertile nuclear fuel depending on the original nuclear fuel rod material inserted into the pin and the state of breeding within the pin.

An example fuel pin 120 is shown in greater detail in View D. The fuel pin 120 includes fuel 122, a getter element 100, and an optional plenum area 124. The getter element 100 stores a material (not shown) that is chemically reactive with a fission product 110 included in an input stream 108 received from the fuel 122. For example, the input stream 110 includes one or more fission products created during nuclear fission of the fuel 122. The getter element 100 includes at least one internal fluid flow path that facilitates continuous transmission of a gas and/or liquid through the getter element 100. The fluid flow path may be, for example, one or more elongated channels, interconnected pores, microfluidic structures, etc. The fluid flow path through the getter element 100 provides a surface area internal to the getter element 100 that may chemically react with the fission product 110 to remove the fission product 110 from the input stream 108, and thereby create an output stream 112 with a lower density of the fission product 110 than the input stream 108. In various implementations, the fission product 110 may be volatile or non-volatile. Although plenum area 124 is shown above the getter element 100, and the getter element 100 above the fuel 122, it is to be appreciated that these components may be placed relative to each other in any suitable order and manner.

The various examples of fuel pins (e.g., the fuel pin 120) described herein may represent venting or non-venting fuel pins. In a venting fuel pin, the plenum area 124 is, at times, in fluid communication with the headspace 148 in a nuclear reactor, or other appropriate gas reservoir. For example, the fuel pin may include various vents or openings that facilitate fluid communication between the plenum 124 and the headspace 148.

As used herein, the term "getter element" (as in the example getter element 100) is meant to refer to any structure including a "getter material" capable of chemically reacting with a fission product and thereby removing a quantity of the fission product from an input stream. Getter material may be incorporated within or formed into a "getter body." For example, a getter body may be a free-standing structure, collection of particulates (e.g., powder), small capsules or pellets. The getter body may include the getter material alone or the getter material in addition to one or more other non-getter materials that do not react with the fission product 110. In some cases, the getter element includes a getter body and also includes a container for holding the getter body.

The getter element 100 includes one or more channels for placing the input stream 108 in fluid communication with a getter body. In one implementation, the getter body has characteristics designed to maximize surface area of contact between a getter body and the input stream 108 passing through the getter element 100. For example, the getter body may include pores or other channels that increase its total surface area. In additional and/or alternative implementations, the getter element 100 includes a container with one or more diffusing elements for directing the input stream 108 into contact with the getter body. Fluid space within or throughout, the getter element 100 and the getter body allows the input stream 108 to contact the getter material and chemically react to remove the fission product 110 from the input stream.

In some implementations, the getter element 100 is not included in a fuel pin (e.g., the fuel pin 120), as shown. Rather, the getter element 100 is positioned elsewhere within the nuclear fission reactor 130 at a position that is accessible to targeted fission products. For example, the getter element 100 may be positioned above the reactor core within the reactor vessel and/or in headspace 148 of the nuclear fission reactor 130 to receive and react with fission product(s) fluid exiting the fuel subassemblies.

Notably, certain structures of the example nuclear fission reactor 130 have been omitted from FIG. 1, such as coolant circulation loops, coolant pumps, heat exchangers, reactor coolant system, etc., in order to simplify the drawing. Accordingly, it should be understood that the example nuclear fission reactor 130 may include additional structures not shown in FIG. 1.

Figure 2:
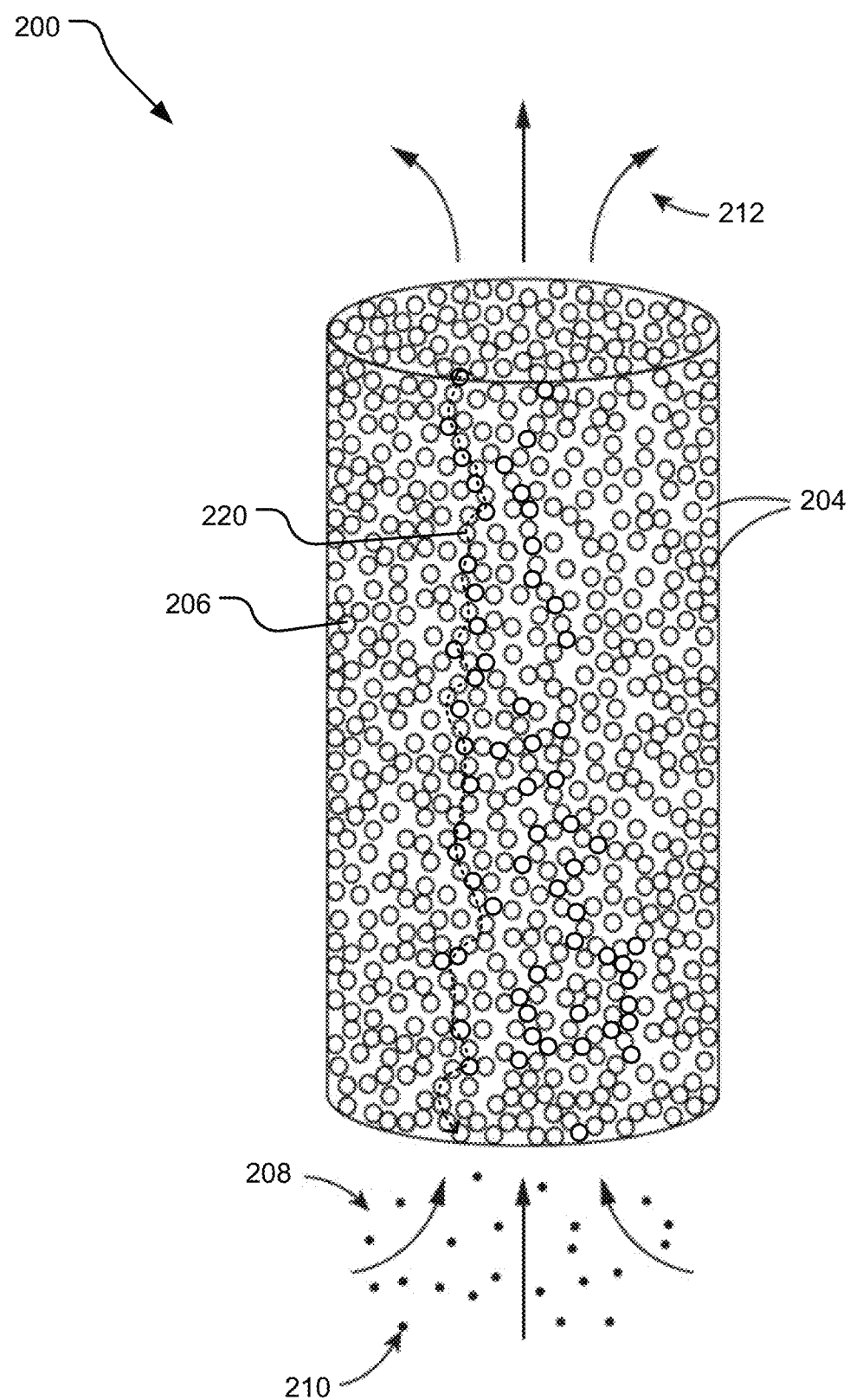
FIG. 2 illustrates an example getter body formed by a volume including getter material.

FIG. 2 illustrates an example getter body 200 formed by a volume including getter material 204. The getter body 200 includes at least one through-channel (e.g., a through-channel 220) for transmitting a flow of an input stream 208 through the getter body 200. The through-channel(s) may extend along a longitudinal length of the getter body 200 (e.g., in the direction of the input stream 208, as shown) and/or may extend in one or more other directions so as to facilitate transport of gas from one side of the getter body 200 to another opposite side.

The through-channel(s) of the getter body 200 assume a variety of different forms in the various implementations disclosed herein. Suitable forms include without limitation interconnected voids or pores, engineered pathways, and/or separations between discrete particles (e.g., in implementations where the getter body is a loose powder as described further with respect to FIG. 3, below).

The input stream 208 may be gaseous, liquid, or a combination thereof, and further includes a fission product 210, which may be gaseous, liquid, solid, dissolved, suspended, or a combination thereof. In one implementation, the getter material 204 includes one or more materials that are chemically reactive with the fission product 210. In this regard, as the input stream 208 containing the fission product 210 contacts the getter body 200, the getter material 204 chemically reacts with the fission product 210 to form a byproduct that is retained within the getter body 200 while the remainder of the input stream 208 exits or moves past or through the getter body 200 as an output stream 212. Thus, the output stream 212 contains less fission product 210 than the input stream 208. The process of removing the fission product 210 from the input stream 208 via chemical reaction with a getter material is also referred to herein as an "uptake" (e.g., the getter body 200 "uptakes" the fission product 210). In one implementation, the getter body is specifically engineered to provide for uptake of substantially all of a select fission product produced within a fuel pin over a period of time, such as over the effective lifetime of the fuel pin. As used herein, uptake of "substantially all" of a select fission product refers to uptake of at least 95% and some cases more than 95% of the select fission product.

The through-channel(s) of the getter body 200 serve multiple purposes. First, the existence of these channel(s) helps to relieve pressure in areas of the getter body 200 and/or corresponding fuel pin by allowing certain content (e.g., inert gases) to escape. Second, the existence of these through-channel(s) provides areas for the getter body 200 to expand into, such as at high burnup rates, thereby decreasing a likelihood of potential damage to associated areas of an associated fuel pin and or fuel subassembly. In one implementation, the through-channel(s) have a sufficient volume to maintain a through-flow above a preselected flow level despite expansion of the getter material within a predetermined range of thermal expansion.

Third, the existence of these through-channel(s) increases available surface area that can react with the fission product 208. In one implementation, the surface area of these through-channel(s) is specifically designed to facilitate uptake of a specific calculated quantity of the fission product 208, such as substantially all of the fission product 208 expected to be produced by an associated fuel pin over a given interval of time.

The fission product 210 of the input stream 208 may be volatile or non-volatile fission product. Example volatile fission products include without limitation: cesium (Cs) or a Cs-based compound (e.g., $Cs_2$, CsBr, $Cs_2I_2$, CsI, etc.), rubidium (Rb) or a Rb-based compound (Rb, $Rb_2$, RbI, RbBr, etc.), strontium (Sr) or a Sr-based compound (Sr, etc.), and iodine (and it compounds). Example non-volatile fission products include without limitation Zirconium, Molybdenum, Neodymium, etc.

The getter material 204 includes any material known in the art as chemically reactive with the fission product 210. Although a variety of materials may be suitable getter materials, some implementations of the disclosed technology include metal oxides within the getter material, such as one or more of zirconium oxide (e.g., $ZrO_2$), titanium oxide (e.g., $TiO_2$), molybdenum oxide (e.g., $MoO_2$, $MoO_3$), niobium oxide ($NbO_2$, $Nb_2O_5$), tantalum oxide (e.g., $Ta_2O_5$), etc. Because the getter materials considered do not show equivalent reactivity with all fission products of concern, the getter material may also be composed of a mixture of components, with the mixture composition tailored to maximize reaction between the getter material and one or more targeted fission products (e.g., 75%-$Ta_2O_3$/25%-$Nb_2O_3$ mixtures). Although in some embodiments it may be beneficial to have these disparate components intermixed, in others it may be beneficial to have discrete layers to selectively remove targeted fission products from the fluid at preferential stages to prevent potential detrimental interactions with subsequent layers of the getter material. The getter material may also include one or more non-reactive components such as binders, structural stabilizers, etc.

In one implementation, the getter material 204 includes one or more materials that react with cesium (Cs) or a Cs-based compound. In the same or another embodiment, the getter material 204 includes at least one material that reacts with Rubidium (Rb) or a Rb-based compound. In the same or another embodiment, the getter material 204 includes at least one material that reacts with Iodine or an iodine-based compound.

In FIG. 2, the getter body 200 is shown to be a cylindrically-shaped solid structure including a void structure 206 (e.g., pores). In one implementation, the void structure 206 includes randomly or regularly distributed pores forming an open pore structure. The distributed pores may be selectively engineered in size, shape, inter-connectivity, structural stability, distribution schema, etc. There exist a variety of suitable processes for forming the void structure 206 and/or other channels within the getter body including without limitation sacrificial templating, additive manufacturing, template replication, and direct foaming. These methods are discussed in greater detail below.

In one embodiment, the void structure 206 of the getter body 200 is formed via a sacrificial templating process. For example, the void structure 206 may be formed by mixing the getter material 204 with a void-forming material. Voids are formed by removing (e.g., burning off or dissolving) the void-forming material. As a result of the removal of the void-forming material, voids (e.g., pores or cells) are formed throughout the volume of getter material 204 of the getter body 200. One example of implementation of a sacrificial templating procedure is described by Andre R. Studart et al. in *Processing Routes to Macroporous Ceramics: Review*, J. Am. Ceram. Soc. 89 [6] 1771-1789 (2006), which is incorporated herein by reference in the entirety. A variety of treatments may be suitable for processing the void material removal from the getter material and form the void structure, including any one or more of dissolving, heat treatment (e.g., during sintering or during a dedicated burn-off cycle), etc. Further details of example sacrificial templating processes are discussed in greater detail with respect to FIGS. 14-20.

In another embodiment, the void structure 206 of the getter body 200 are formed via an additive manufacturing process. For example, the getter body 200 may be fabricated via a three-dimensional printing process. In this regard, the void structure 206 of the getter body 200 may be directly engineered and the formation of which may be directly controlled via the manufacturing process. Selective laser sintering, used to three-dimensionally print materials, may be additionally or alternatively appropriate and is generally described in U.S. Pat. No. 4,863,538, filed on Oct. 17, 1986, which is incorporated herein by reference in the entirety. Further details of example additive manufacturing processes are described with respect to FIG. 20-23, below.

In another embodiment, the void structure 206 of the getter body 200 is formed via a template replication process. For example, pores may be formed through impregnation of a void structure (e.g., cellular or porous structure) with a getter material suspension (or precursor solution), resulting in a volume of porous getter material exhibiting the same (or nearly the same) morphology as the original porous material. One example of a replica procedure is described by Andre R. Studart et al. in *Processing Routes to Macroporous Ceramics: Review*, J. Am. Ceram. Soc. 89 [6] 1771-1789 (2006), which is incorporated above by reference in the entirety. Basic procedural steps in template replication are described with respect to FIG. 24.

In another embodiment, the void structure 206 of the getter body 200 is formed via a direct foaming process. For example, the void structure 206 of the getter body 200 may be formed through incorporation of a gas (e.g., air) into a suspension or liquid form of the getter material (or a precursor of the getter material), which serves to establish a foam structure within the suspension or liquid. The material then undergoes a setting or solidifying step, which serves to lock in the void structure 206 formed within the foam. One appropriate example of a direct foaming procedure is described by Andre R. Studart et al. in *Processing Routes to Macroporous Ceramics: Review*, J. Am. Ceram. Soc. 89 [6] 1771-1789 (2006), which is incorporated above by reference in the entirety. Basic procedural steps in direct foaming are described with respect to FIG. 25.

In yet other embodiments, the void structure 206 of the getter body 200 is formed by other physical methodologies (e.g., mechanical grinding, etching laser ablation, etc.), or chemical methodologies such as chemical etching. Notably, any two or more of the above-described techniques (e.g., sacrificial templating, additive manufacturing, template replication, direct foaming, chemical/physical etching, grinding, ablation, etc.) may also be used in combination to create the void structure 206. For example, a sacrificial templating process may be initially used to create small voids in the getter body 200 and a machining process may thereafter be used to create larger voids, such as near a fission gas inlet of the getter body 200.

Figure 3B:
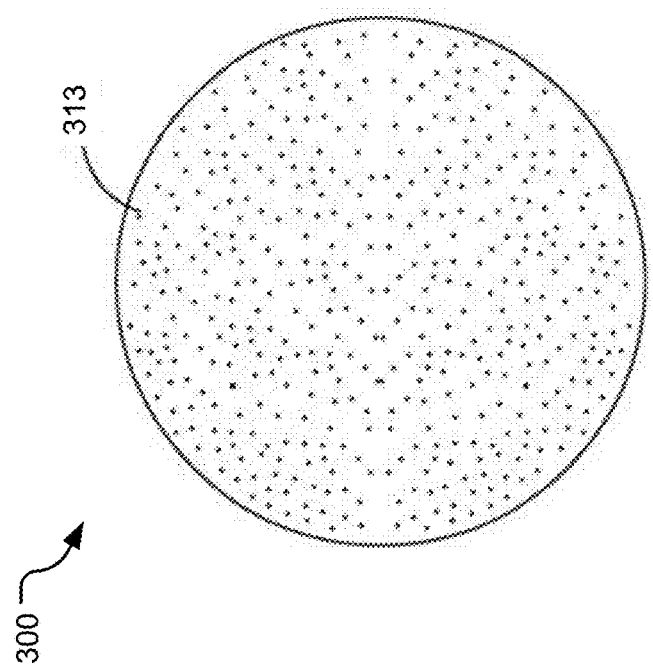
FIG. 3B illustrates another view of one of the capping elements illustrated in FIG. 3A.
Figure 3A:
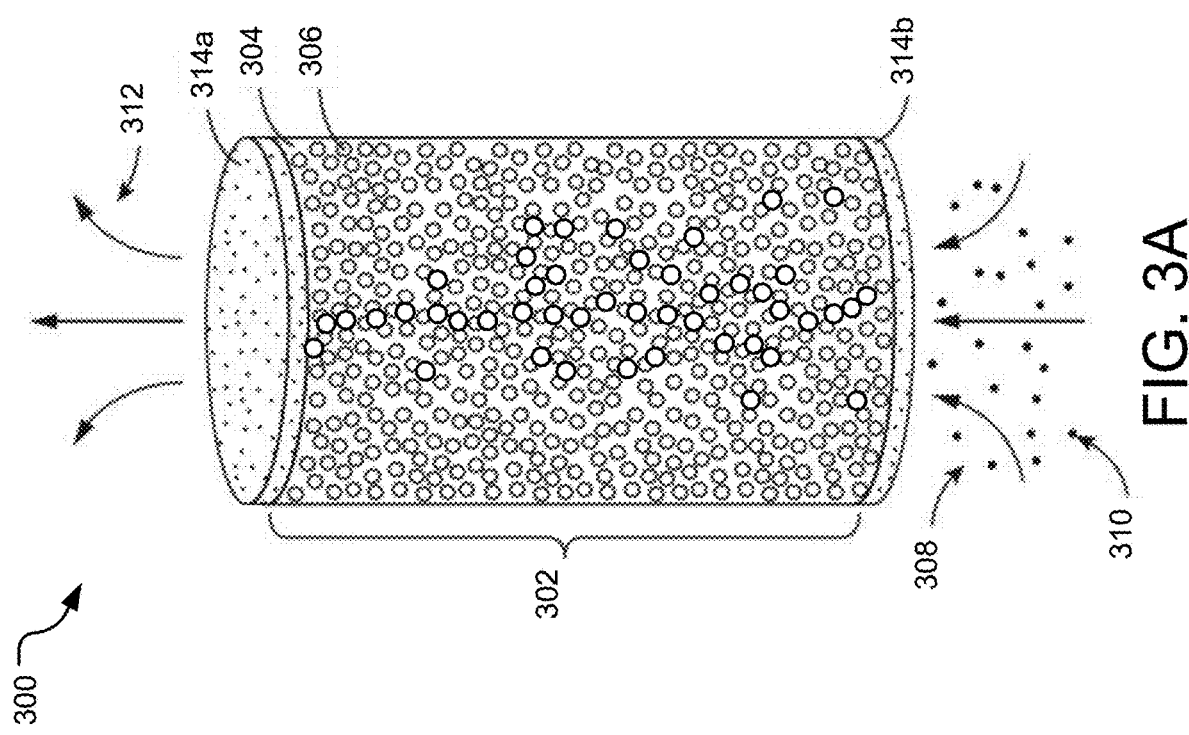
FIG. 3A illustrates an example getter element including a getter body supported by capping elements.

FIGS. 3A-3B illustrate simplified schematic views of an example getter element 300 including a getter body 302 configured to rest between and/or attach to capping elements 314a, 314b at either end. Although other structures are also contemplated (e.g., with respect to FIGS. 4-5), the getter body 302 of FIG. 3 is a free-standing, solid element including a void structure 306. In operation, the capping elements 314a, 314b serve to provide mechanical support to the getter body 302 and to further facilitate venting of an input stream 308 through the getter element 300.

In some implementations, the main getter body 302 is not a solid free standing structure. For example, the main getter body 302 may be in particulate form (e.g., powder) or be a collection of elements (e.g., solid pellets or small capsules further storing particulates). In these implementations, the capping elements 314a, 314b may be used in combination with a container or supporting shell for containing and further supporting the main getter body 302.

The capping elements 314a, 314b are made from heat-stable materials that resist deformation when subjected to the high temperatures and neutron fluxes of a nuclear reactor core. Ideal candidate materials may also be non-reactive with fission products (e.g., a fission product 310) included in the input stream 308. Example suitable materials for the capping elements 314a, 314b include, for example steels, refractory metals/alloys, or structural ceramics.

In FIGS. 3A and 3B, the one or more capping elements 314a, 314b are formed from a porous material. For example, the one or more capping elements 314a, 314b may include a porous metal plate 313 (e.g., porous metal disk as shown in FIG. 2B). Other porous structures, such as vents, mesh-like material, etc., are also contemplated. In one implementation, the capping elements 314a, 314b are solid structures that include a plurality of through-holes, such as drilled holes. The holes may be a variety of sizes and distributions depending on specific implementation details such as the desired flow rate, specific getter material, targeted fission product(s), etc.

FIGS. 4A and 4B illustrate simplified schematic views of another example getter element 400 including a getter body 402 configured to rest between and/or attach to capping elements 414a and 414b. The getter body 402 has a void structure 406 and includes a getter material 404 for reacting with a fission product 410 included within an input stream 408, thereby reducing a concentration of the fission product 410 in an output stream 412 as compared to the input stream 408. Unlike the porous structure of the capping elements in FIGS. 3A, 3B, the capping elements 414a, 414b are vented metal plates 415 (e.g., vented metal disk). Suitable construction materials and other details of the capping elements 414a, 414b may be the same or similar to that described above with respect to FIGS. 3A, 3B.

Figure 5A:
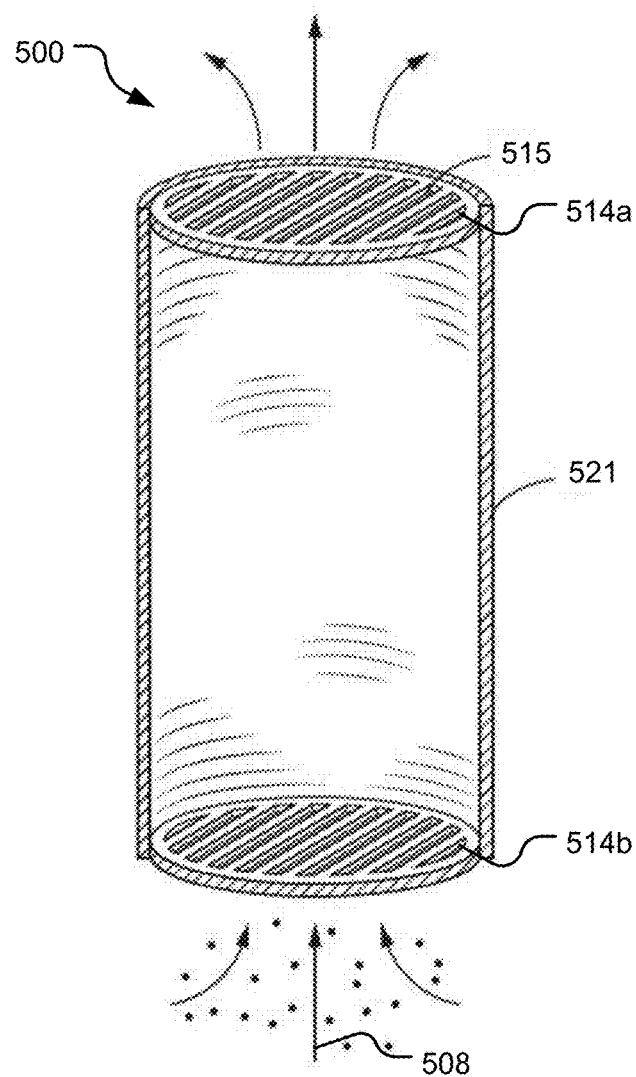
FIG. 5A illustrates an example support structure suitable for use in a getter element.

FIG. 5A illustrates a simplified schematic view of an example support structure 500 suitable for use in a getter element. The support structure 500 includes a container portion 521 attached to endcaps 514a, 514b. In operation, the support structure 500 may provide mechanical support to a getter body and facilitate venting of an input stream 508 through the getter element and/or getter body. The support structure 500 may support a solid, free-standing getter body (e.g., as in the main getter body portion 402 of FIG. 4A); alternatively, the support structure 500 may support a getter body that is in particulate form (e.g., powder) or otherwise represented as a collection of free-standing elements (e.g., solid pellets or small capsules further storing particulates).

The container portion 521 may be formed from any material that provides thermal and chemical and structural stability in the presence of fluid flow, neutron irradiation, and fission products of a selected nuclear reactor environment. In one embodiment, the container portion 521 is formed from steel. Other suitable container materials could include refractory metals or alloys, as well as structural ceramics. Although not shown in FIG. 5, the container portion 521 may include a plurality of openings about its circumference to allow for fluid and/or gas to flow through the sides of the container portion 521 as well as through vents 515 or porous openings in the endcaps 514a, 514b. In various implementations, any suitable number, size, location, and/or distribution of vents 515 in the capping element 514a may be used as appropriate for design and/or safety considerations.

Figure 5B:
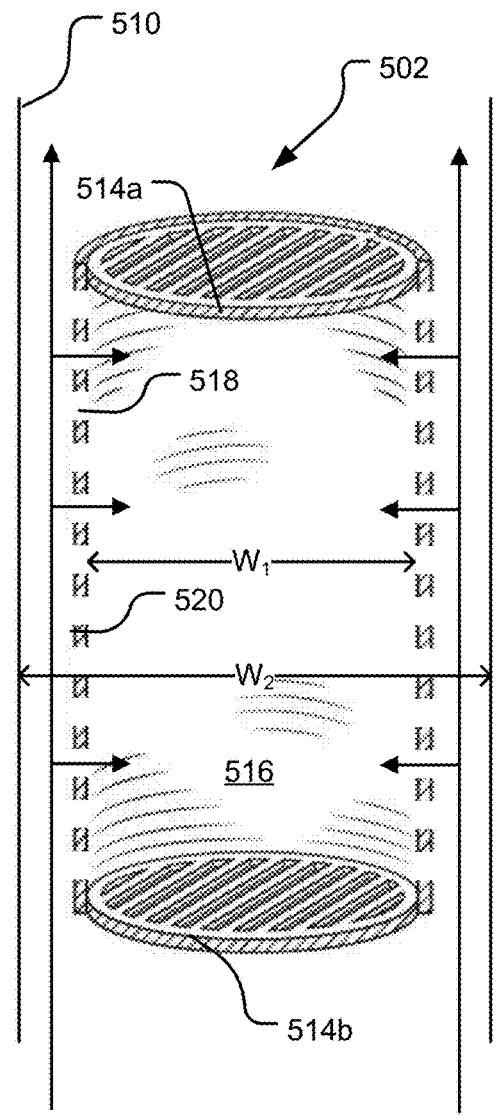
FIG. 5B illustrates a simplified schematic view of another example support structure suitable for use in a getter element.

FIG. 5B illustrates a simplified schematic view of another example support structure 502 for positioning a getter body (e.g., as in the getter body 200 of FIG. 2 or 300 of FIGS. 3A and 3B) within a fuel pin 510. The support structure 502 includes porous endcaps 514a, 514B and a central body 516 with number of peripheral openings (e.g., an opening 518) in a cylindrical sidewall 520 to allow for intake of a fluid flow into a center of the support structure 502 and within the getter body (not shown). In one implementation, a width W1 of the support structure 502 is slightly less than a width W2 of the fuel pin 510 so as to allow a fluid flow to bypass the endcap 514a and to enter the support structure 502 through one or more of the openings (e.g., the openings 518) in the cylindrical sidewall 520.

Figure 6:
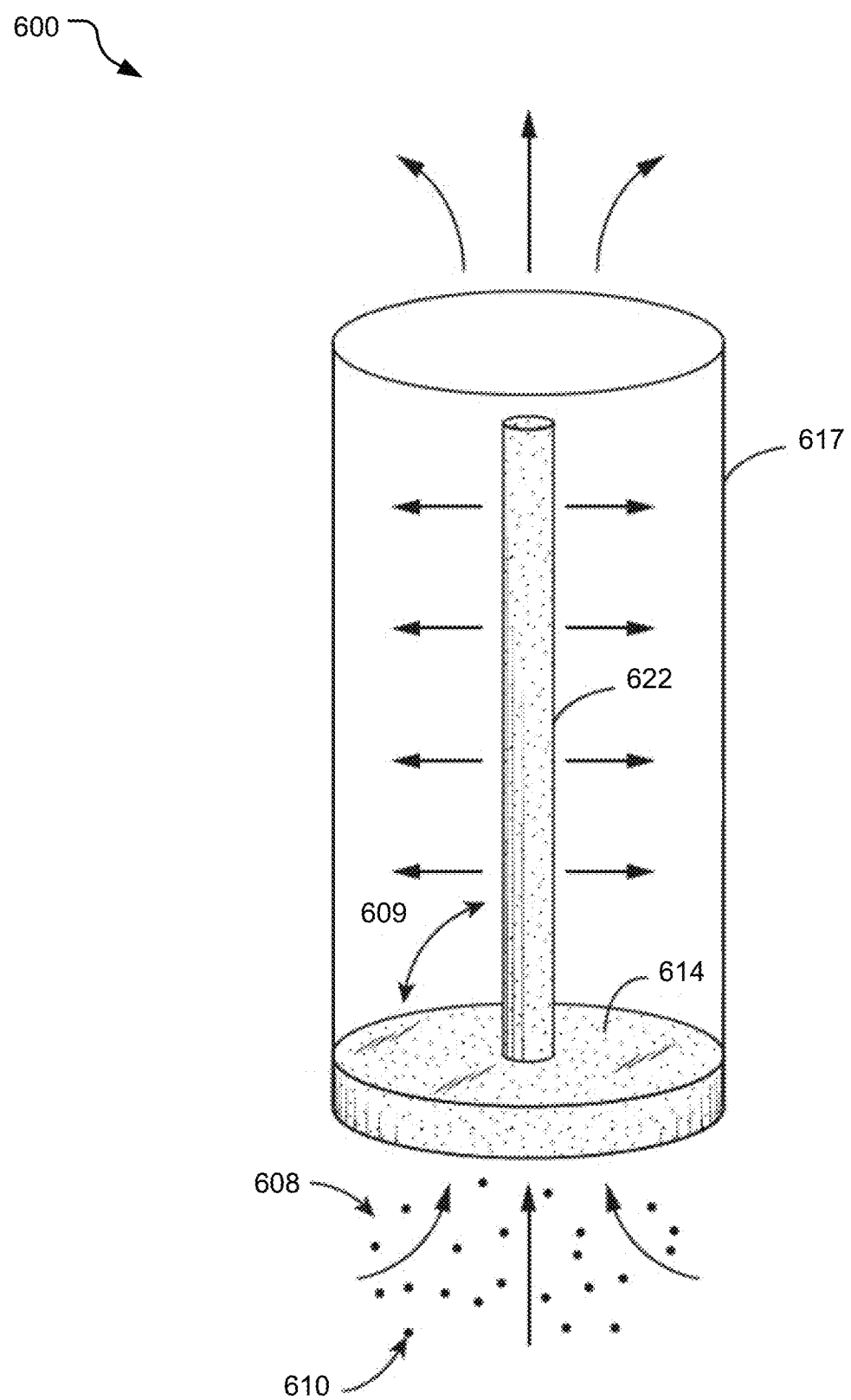
FIG. 6 illustrates another example support structure suitable for use in a getter element.

FIG. 6 illustrates a schematic view of a portion of another example support structure 600 suitable for use in a getter element. The support structure 600 includes a container portion 617 and a diffuser assembly 609. The diffuser assembly 609 further includes a diffuse capping portion 614 and a diffuse channel portion 622 (e.g., an elongated central channel). In operation, a getter body (not shown) is stored within the container portion 617. For example, the getter body may surround or partially surround the diffuse channel portion 622. The diffuser assembly 609 helps to bring gas or liquid of an input stream 608 into fluid communication with the getter material of the getter body. For example, the diffuse capping portion 614 and the diffuse channel portion 622 includes openings (e.g., pores, vents, etc.) that provide fluid flow paths into and/or through the getter body.

The diffuse channel portion 622 is shown in FIG. 6 as a singular central channel with a number of holes allowing gas to freely flow between areas internal to the diffuse channel portion 622 and areas external to the diffuse channel portion 622. However, it is to be appreciated that the support structure 600 may include a plurality of channels in lieu of or in addition to the diffuse channel portion 622. For example, the diffuser assembly 609 may include other channels distributed throughout other regions of the container portion 617. In some cases, the diffuser assembly 609 includes a gas transmission channel that surrounds the getter body, such as a porous annular channel surrounding the getter body.

Due to the uptake of a fission product 610 into the getter body, the getter body, over time, accumulates the fission product 610. Accumulation of fission product 610 within the getter body may result in the reduction of fission gas flow through the container portion 617 and/or throughout the getter body within the container portion 617. In some instances, where accumulation is severe, one or more porous structures of the getter body may be become blocked. In such cases, the diffuser assembly 609 may help to maintain a flow of the input stream 608 through a getter material (not shown) regardless of this blockage. In addition, the diffuser assembly 609 may serve to ensure fluid flow through fluid flow paths within the getter body in the event of volumetric expansion of the getter material of the getter body.

The diffuse capping portion 614 may take on a variety of forms, such as that of a porous metal or ceramic plate or a vented plate with a set of vent holes. The diffuse channel portion 622 is also porous and may be, for example, a porous metal rod or a metal rod with a set of vent holes. Some non-metal materials (e.g., ceramics) may also be suitable for forming all or various components of the diffuser assembly 609.

Figure 7:
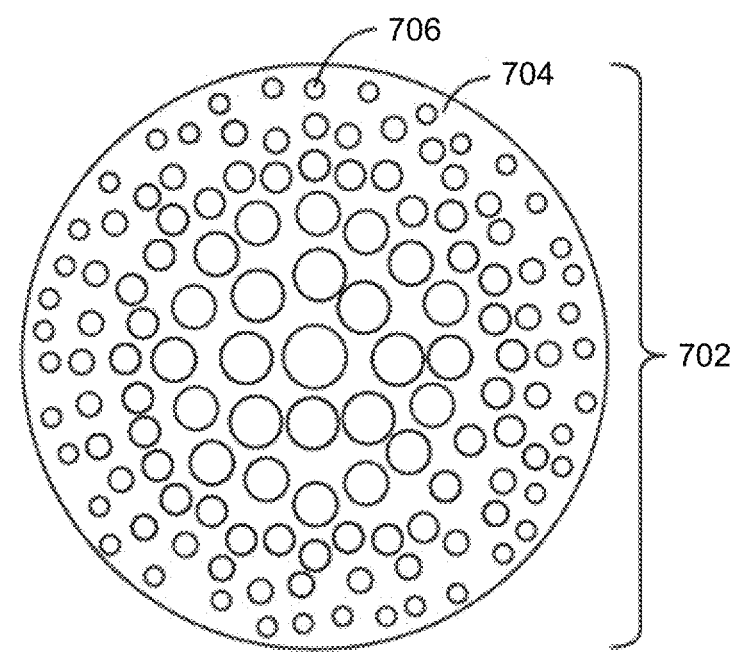
FIG. 7 illustrates an end-on view of another example getter body.

FIG. 7 illustrates an end-on view of a portion of another example getter body 702 with void structures 706. In one implementation, the getter body 702 is sized and shaped to rest within one of the corresponding support structures 500 or 600 of FIGS. 5 and 6, respectively. In operation, the illustrated end of the getter body 702 may receive an input stream including a fission product. When the input stream contacts the getter body 702, getter material 704 in the getter body 702 chemically reacts with one or more fission products in the input stream, removing those fission product(s) from the stream.

In FIG. 7, the getter body 702 is a free-standing solid structure. For example, the getter body 702 may be a porous sintered metallic or ceramic structure. Although other arrangements are contemplated, the void structures 706 of the getter body 702 are arranged such that the size varies as a function of position within the getter body 702. For example, size of the void structures 706 may generally decrease as a function of radial distance from the center of the getter body 702. For example, the distribution of void structures 706 may be influenced by the size and/or weights of void-forming structures utilized during fabrication of the getter body 702. In this regard, void-forming structures (e.g., such as those described below with respect to FIGS. 13-20) may, when mixed with the getter material 704, act to self-sort and form a distribution (e.g., gradient distribution) via a settling and/or agitation process.

The void structures 706 of the getter body 702 may be distributed throughout the getter body 702 in any pattern or distribution. In some implementations, the void structures 706 include pores in greater size near a fission gas inlet and pores smaller in size near a fission gas outlet.

Figure 8:
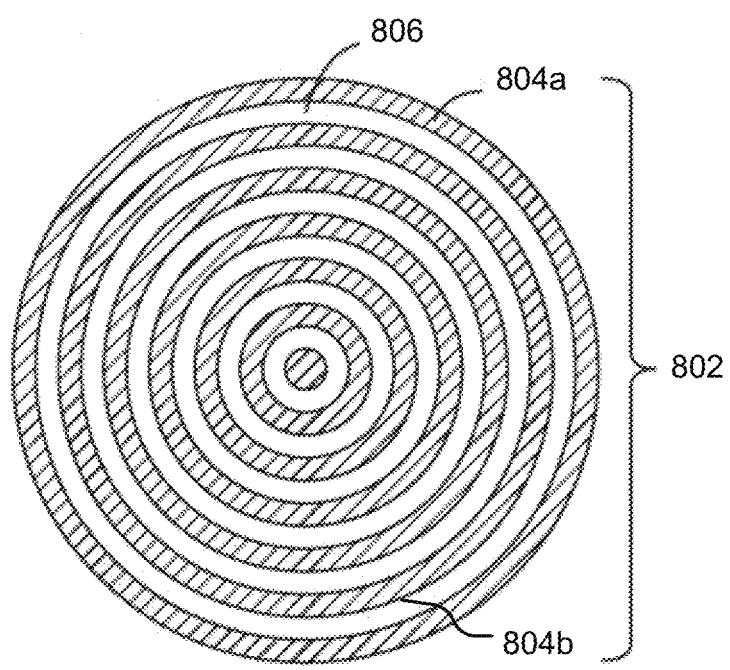
FIG. 8 illustrates an end-on view of yet another example getter body.

FIG. 8 illustrates an end-on view of a portion of another example getter body 802 that is cylindrical in shape and includes multiple concentric regions 804a, 804b of getter material separated from one another by transmission pathways (e.g., an annular-shaped void 806). The illustrated arrangement may help to maximize a surface area of contact between the getter material of the getter body 802 and an input stream (not shown) that is directed through the getter body 800. In one implementation, the concentric regions 804a, 804b of getter material are solid structures, such as sintered metallic or ceramic structures. In another implementation, the getter body 802 is formed via a powder that fills each of a number of porous concentric shells of a getter container. A variety of other structures are also contemplated (some of which are described with respect to the following figures).

Figure 9:
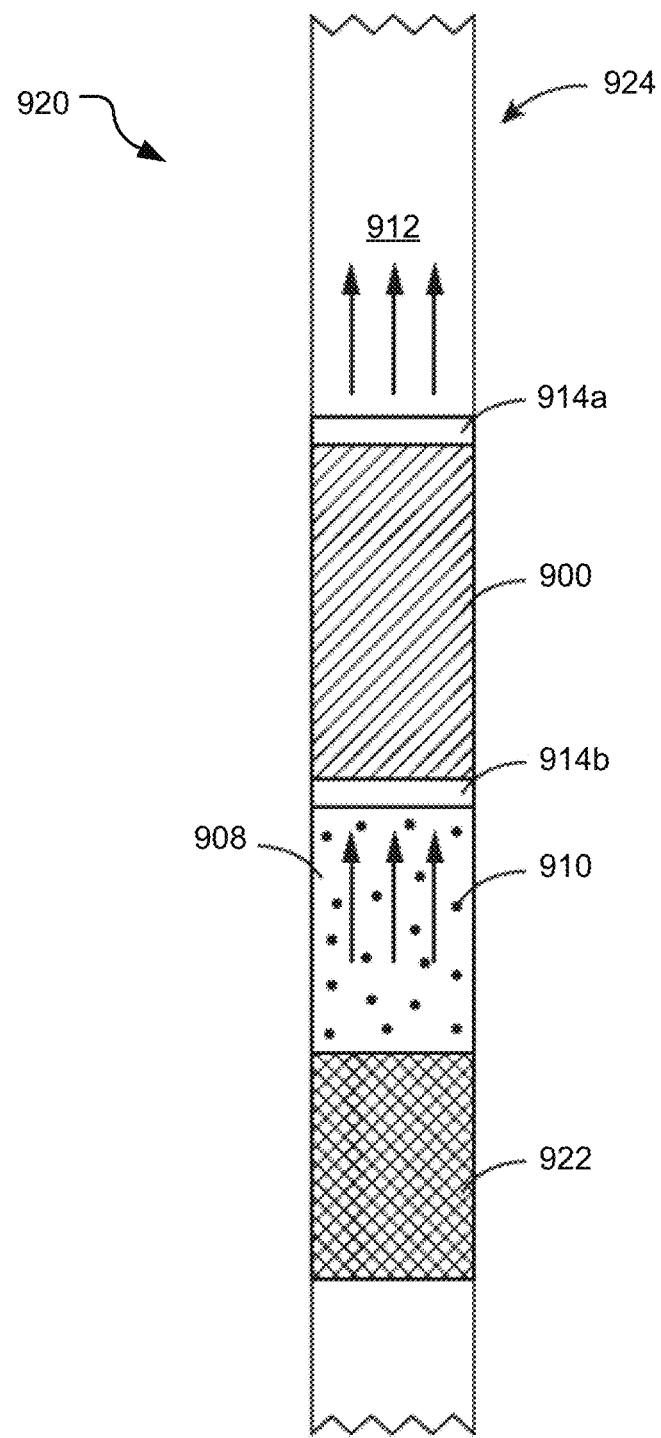
FIG. 9 illustrates a cross-sectional view of a fuel pin of a nuclear reactor equipped with an example getter element.

FIG. 9 illustrates a cross-sectional view of a fuel pin 920 of a nuclear reactor equipped with an example getter element 900. The getter element 900 is shown disposed within fuel pin 920 and positioned to receive an input stream 908 (e.g., fission gas) from nuclear fuel 922 of the fuel pin 920. For example, the getter element 900 is disposed (alone or in combination with other getter elements) at a location upstream of the nuclear fuel 922 and origination point of the input stream 908, but downstream of a fission gas plenum 924. In another implementation, the getter element 900 is positioned within the fission gas plenum 924 (e.g., with or without space of the plenum on either or both ends of the getter element 900).

Capping elements 914a and 914b provide barriers between the getter element 900 and the immediately adjacent structures. In one implementation, the separation caps 914a, 914b are porous endcaps (e.g., plates with pores or vents). In another implementation, the separation caps 914a and 914b are valves that open under pressure generated by the input stream 908.

The getter element 900 includes a getter body (not shown) including a getter material that reacts with one or more volatile or non-volatile fission products 910, resulting in an output stream 912. The output stream 912 exiting the getter element 900 has a lower volatile fission product content level than the input stream 908 entering the getter element 900. In one embodiment, the output stream 912 is vented from the fuel pin 920, such as through one or more pin vents of the fission plenum 924.

In some implementations, the getter material reacts with one or more volatile fission products 910 in the input stream 908 such as cesium, rubidium, strontium, etc. In additional or alternative implementations, the getter material of the getter body reacts with one or more non-volatile fission products.

Figure 10:
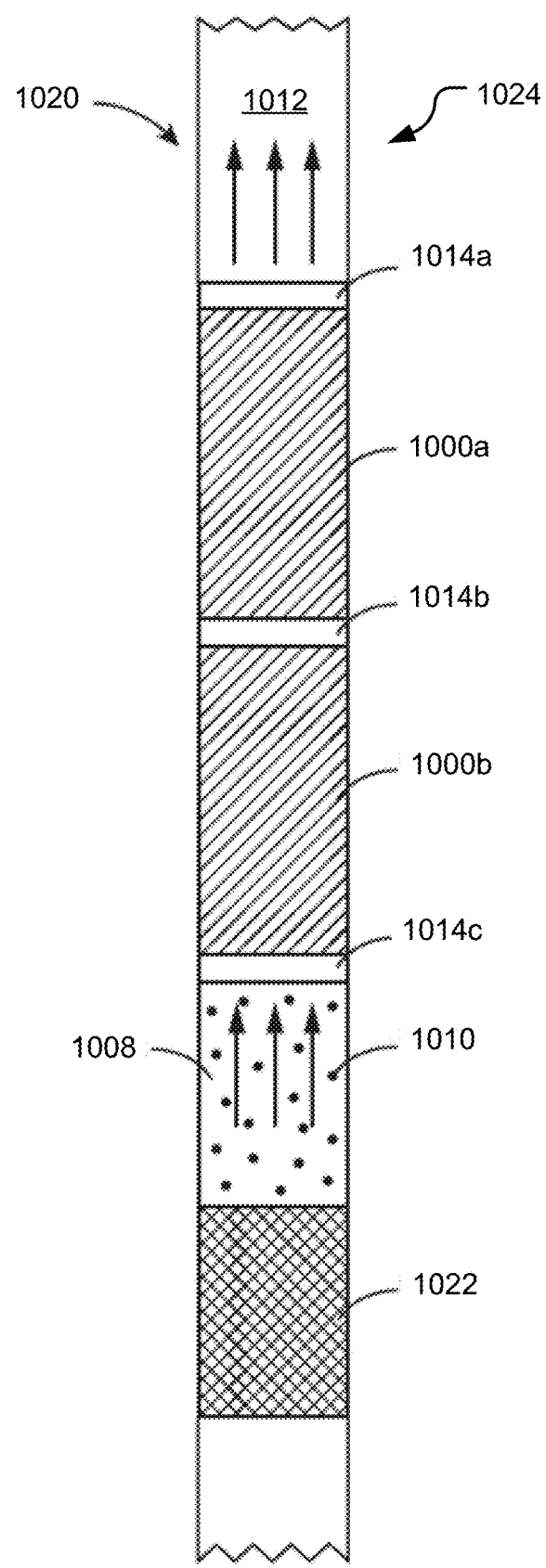
FIG. 10 illustrates a cross-sectional view of a fuel pin of a nuclear reactor equipped with two example getter elements arranged in series between nuclear fuel and a fission plenum.

FIG. 10 illustrates a cross-sectional view of a fuel pin 1020 of a nuclear reactor equipped with two example getter elements 1000a, 1000b arranged in series between nuclear fuel 1022 and a fission plenum 1024. In operation, fission gas from the fuel 1022 is passed via an input stream 1008 through the getter elements 1000a, 1000b in series. Within each of the getter elements 1000a, 1000b, one or more fission products 1010 within the input stream 1008 undergo chemical reactions with getter material, thereby cleaning or partially cleaning the input stream 1008 to reduce a concentration of the fission product 1010 in an output stream 1012. Separation caps 1014a, 1014b, 1014c are barriers that are either porous or capable of selectively opening, such as under pressure of the input stream 1008.

In one implementation, the first getter element 1000a includes a first getter material for targeting the uptake of a first fission product, while the second getter element 1000b includes a second getter material for targeting the uptake of a second fission product. For example, the first material of the first getter element 1000a may include a getter material targeted for uptaking a first element or compound, while the second material of the second getter element 100b may include a getter material targeted for uptaking another compound including the first element and/or another different element. In one exemplary implementation, one of the two getter elements 1000a and 1000b includes a getter material for uptake of cesium, such as niobium or titanium oxides, while the other one of the two getter elements 1000a and 1000b includes a different getter material for uptake of iodine, such as silver, copper, or barium.

It is noted herein that fuel pin 1020 of FIG. 10 is not limited to two getter elements or the materials listed above, which are provided merely for illustrative purposes. Other implementations may include fewer or greater than two getter elements.

It is noted herein that the shape of the one or more getter elements (e.g., 1000a, 1000b) of the present disclosure is not limited to the cylindrical shape depicted in FIGS. 1-10. The one or more getter elements 1000 of the present disclosure may take on any general geometrical shape. In other implementations, the one or more getter elements take on a variety of shapes including without limitation hexagonal prism shapes, parallelepiped shapes, triangular prism shapes, helical shapes, conical shapes or the like. In one embodiment, the one or more getter elements 1000 contained within the fuel pins 1020 are structured so as to substantially conform to the internal shape of the fuel pins 1020. In this regard, the one or more getter elements 1000 may take on any shape known in the art based on the shape of the fuel pins 1020.

It is noted that the getter element(s) (e.g., 1000a, 1000b) of the present disclosure may be adapted to operate in any nuclear reaction environment. The nuclear fuel contained within the fuel pin 1020 may include any fissile and/or fertile nuclear fuel known in the art including without limitation recycled nuclear fuel, unburned nuclear fuel, and enriched nuclear fuel.

In one embodiment, the fuel 1022 includes a metal nuclear fuel and is used to form a core of a metal fuel nuclear reactor along with a plurality of other fuel pins. In one embodiment, metal fuel nuclear reactor is a fast reactor. For example, the metal fuel nuclear reactor may include a breeder reactor, such as, but not limited to, a traveling wave reactor.

Figure 11:
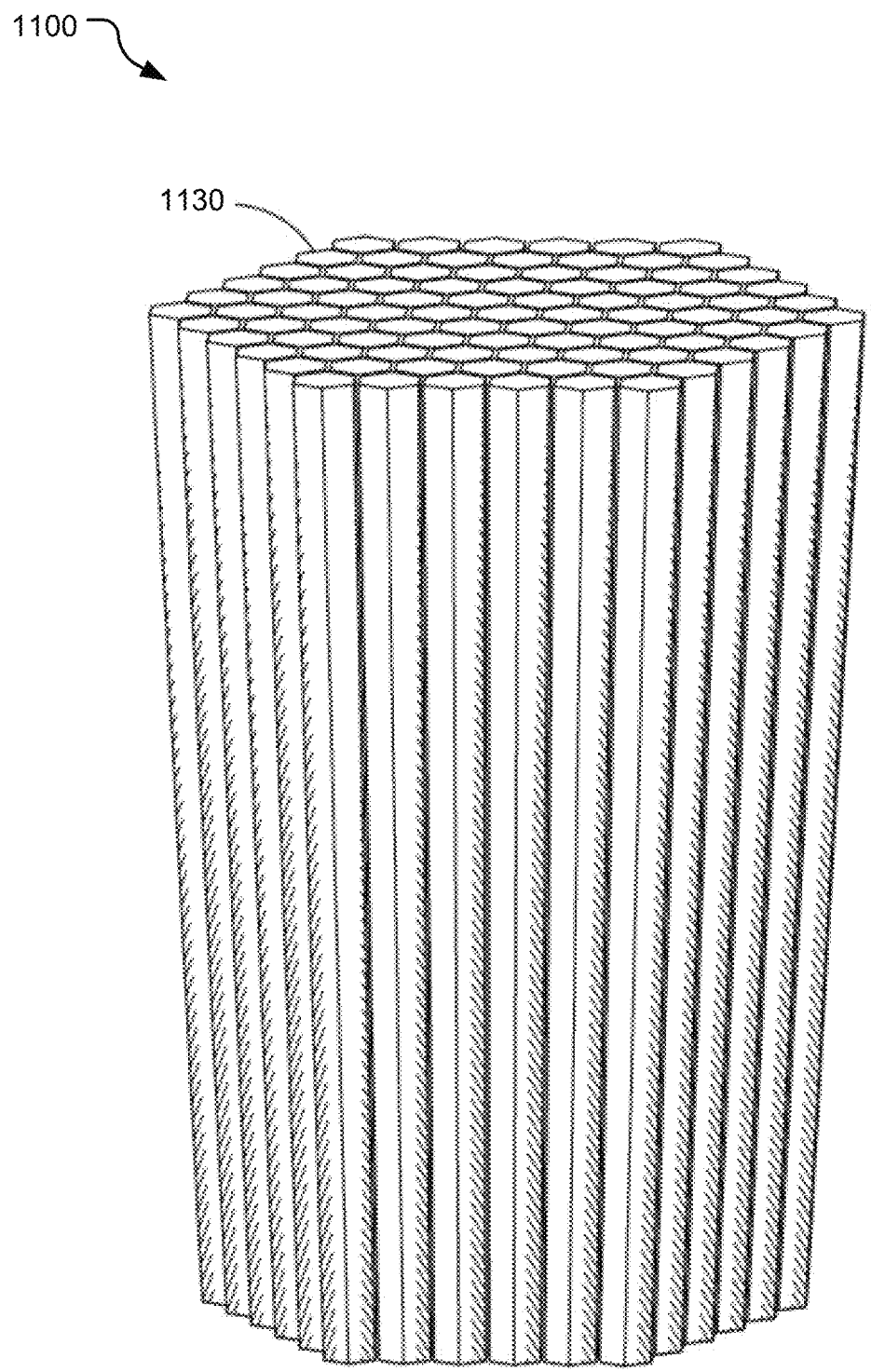
FIG. 11 illustrates a top view of an example fuel assembly including a set of fuel pins containing getter elements.

FIG. 11 illustrates a perspective view of a nuclear reactor core 1100 including a set of fuel assemblies (e.g., a fuel assembly 1130). Each fuel assembly further includes a set of fuel pins and each fuel pin includes one or more getter elements, as discussed previously herein.

The structure and arrangement of the fuel assemblies of the reactor core may take on any form known in the art. In the example arrangement of FIG. 11, the fuel assemblies are arranged in a hexagonal array. It is noted that the arrangement depicted in FIG. 11 is not a limitation on the present disclosure and is provided merely for illustrative purposes. In some implementations, the fuel assemblies are arranged according to other shapes such as, but not limited to, a cylinder, a parallelepiped, a triangular prism, a conical structure, a helical structure and the like.

Figure 12:
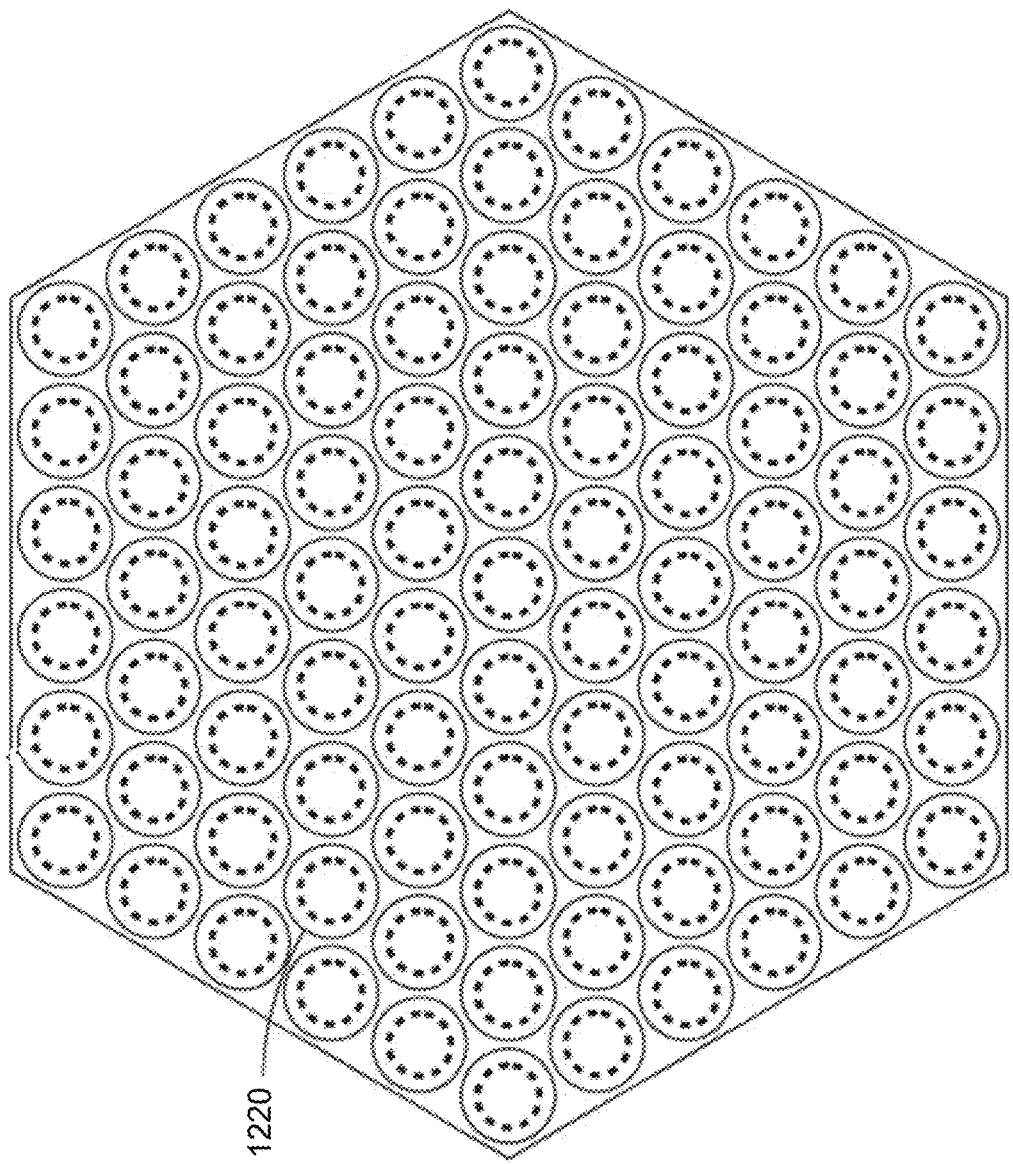
FIG. 12 illustrates a perspective view of a nuclear reactor core including a set of fuel assemblies.

FIG. 12 illustrates a top view of an example fuel assembly 1200 including a set of fuel pins (e.g., a fuel pin 1120). Each of the fuel pins is equipped with one or more getter elements for cleaning a fission gas to remove one or more volatile or non-volatile fission products. In FIG. 12, the fuel pins are cylindrically-shaped and are arranged in a close packed hexagonal array; however, this arrangement may take on other forms in other implementations. For example, the fuel pins 1220 of the fuel assembly 1200 may individually be shaped hexagonally, parallelepiped, triangular, helical, conical or the like. In other embodiments, although not shown, the fuel pins 1220 of the fuel assembly 1200 may be arranged in a rectangular array, a square array, a concentric ring array and the like.

Figure 13:
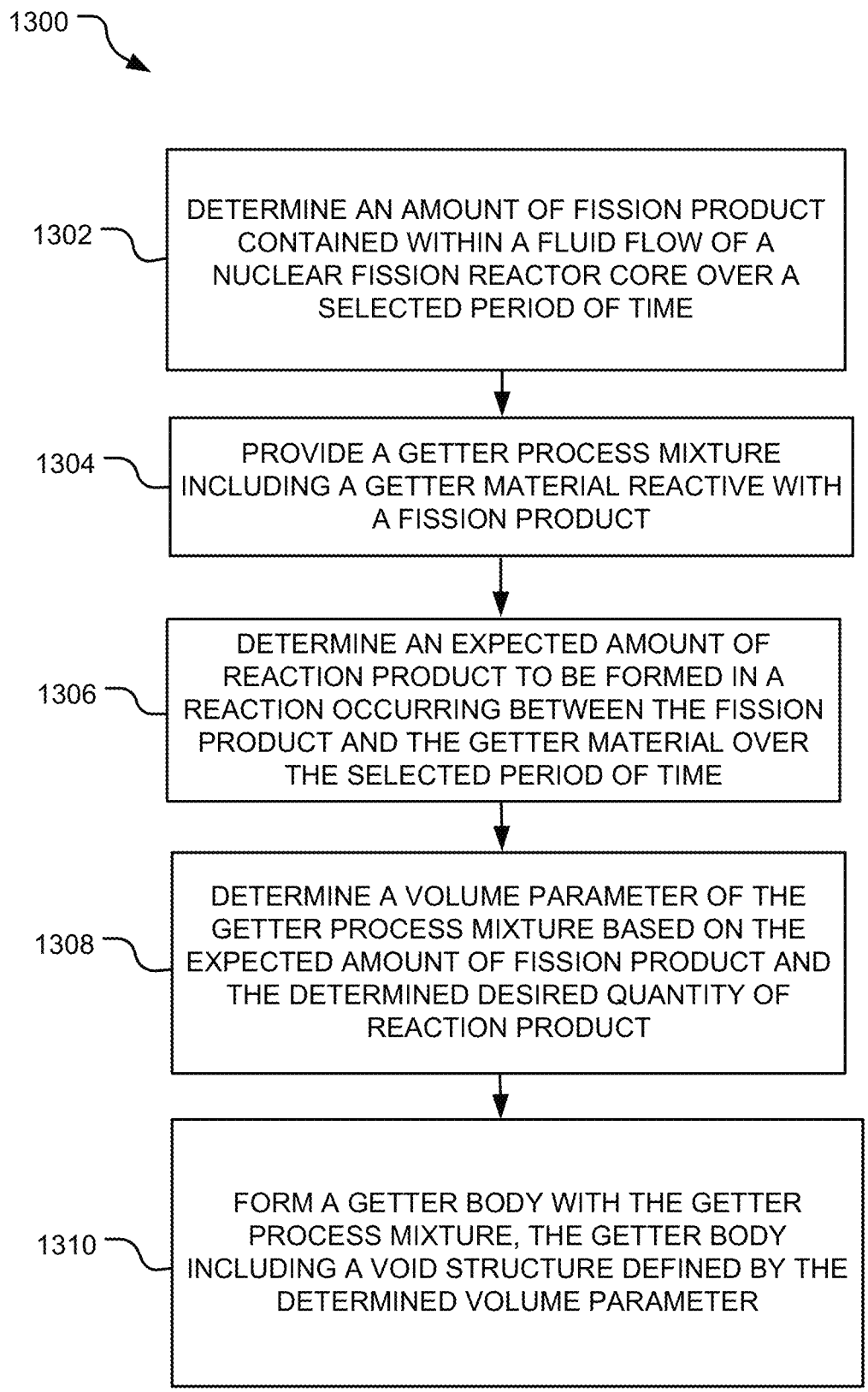
FIG. 13 illustrates example operations for forming a getter body for use in cleaning a fission gas output stream of a nuclear reactor.

FIG. 13 illustrates example operations 1300 for forming a getter body for use in cleaning a fission gas output stream of a nuclear reactor. A determining operation 1302 determines an amount of fission product contained within a fluid flow output from a nuclear fission reactor core over a selected period of time. The selected period of time can be a single or multiple fuel cycles and may be the expected lifetime of a single fuel pin or fuel assembly of the reactor. It is to be appreciated that different fuel assemblies and/or fuel pins may have different expected lifetimes or fuel cycles which can be accommodated with different expected fission product determinations for different fuel elements. The amount of fission product contained within the fluid flow further corresponds to a specific amount of nuclear fission fuel consumed during the selected period of time which can be determined using any suitable neutronic methods and/or model of the present fuel type and expected neutronic environment of the fuel element (e.g., fuel burn up) over the specified period of time.

A providing operation 1304 provides a getter process mixture that includes a getter material reactive with a fission product of the fluid flow output from the nuclear fission reactor core. An amount of the getter process mixture to use in forming the getter body is determined by operations 1306 and 1308, described below.

Another determining operation 1306 determines a desired yield of a reaction product to be formed via a chemical reaction between the fission product and the getter material over the selected period of time. In one implementation, the desired yield of the reaction product is an amount calculated as resulting from a reaction between the getter material and substantially all of the fission product determined in the determining operation 1302. Based on the desired yield of reaction product, another determining operation 1308 determines a volume parameter of the getter process mixture that identifies an amount or volume of the getter process mixture needed to yield the desired amount of reaction product in the selected period of time. The determining operation 1308 may also determine not only the amount of the getter process mixture but also a desired volumetric measure or density of the getter material suitable for uptake of the volume parameter of the desired yield of a reaction product. Specifically, the reaction product, when uptake occurs has a volume that may decrease the void structure or increase the density of the getter material. By determining this volume of the desired yield of the reaction product (or predetermined amount of reaction product), a volumetric parameter of the getter material can be selected that matches or exceeds the determined volume of the desired yield of the reaction product to ensure that fluid flow through the getter material is maintained (which may be maintained at or above a selected flow rate or flow level) and/or volumetric swelling of the getter material stays within design boundaries. For example, the volumetric parameter of the getter material may include without limitation, any one or more of pore size, pore concentration, theoretical density of the getter material, mass ratio of getter material to sacrificial void forming structures, etc.

A forming operation 1310 forms a getter body defined by the determined volume parameter. The getter body is formed by the getter process. In some implementations, the forming operation 1310 further entails placing the getter body within a container (e.g., forming a final "getter element" includes at least one channel or passageway for transmission of gas or liquid therethrough).

In some implementations, the getter element includes a getter body in the form of loose powder, a plurality of pellets, particulates, etc., within a porous container. In other implementations, the getter body is formed by a number of chemical and/or physical processes that generate a solid (e.g., free-standing) structure, such as a solid structure including a number of interconnected pores or a plurality of void regions. Thus, the getter element may not always include a container. The getter body may include channels or pores of a variety of other shapes, such as elongated channels. In still other implementations, the getter body is formed by multiple different porous components (e.g., a plurality of free-standing porous pellets, porous diffusing components, etc.)

Figure 14:
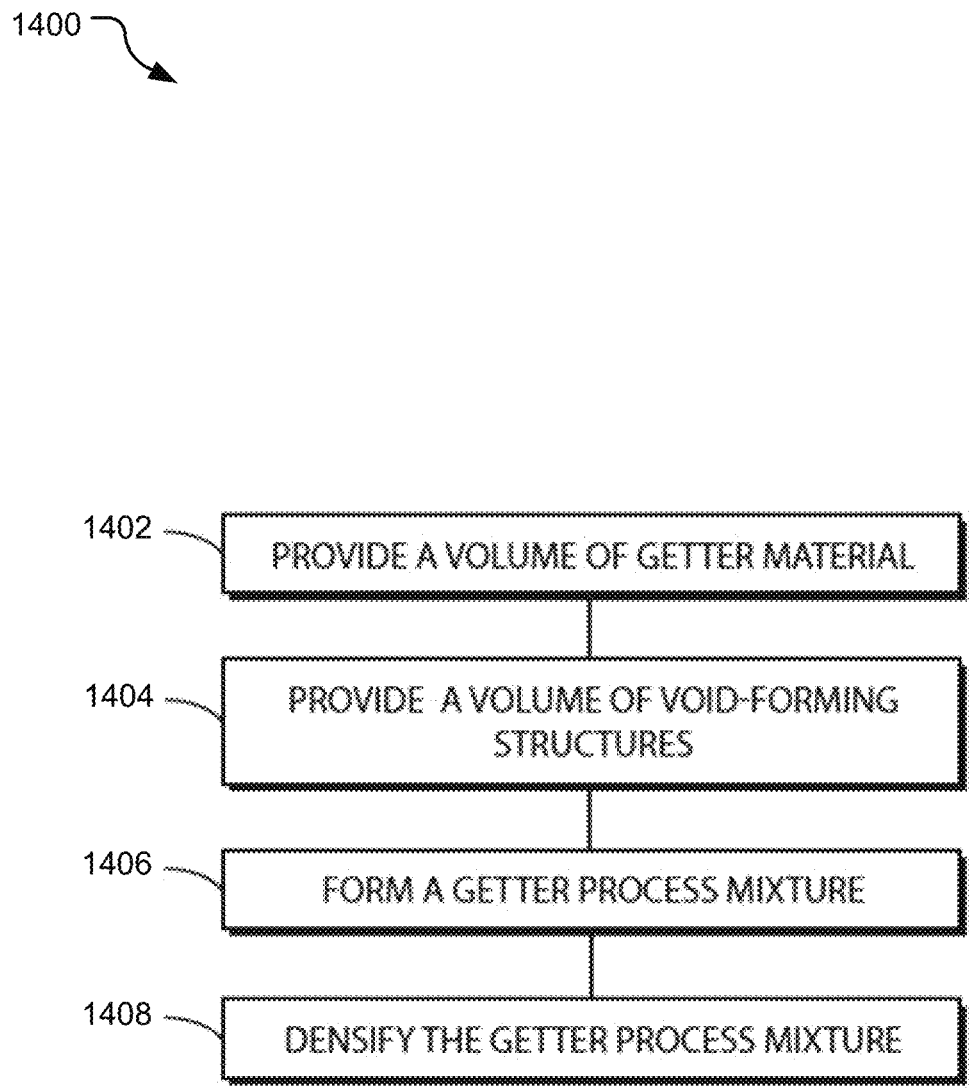
FIG. 14 illustrates a series of example operations for preparing a getter process mixture and forming a getter body with a plurality of voids.

FIG. 14 illustrates a series of example operations 1400 for preparing a getter process mixture and forming a getter body with a plurality of voids (e.g., pores). The example operations 1400 disclose void creation via use of sacrificial structures, which are structures that decompose (thereby forming 'voids' within the getter process mixture) upon thermal and/or chemical treatment. In other implementations (such as those described with respect to FIGS. 20-25 below), voids of the getter body are formed by other methodologies and/or other void-forming structures. For example, additive manufacturing, template replication, and direct foaming are all suitable methods for creating void-forming structures that do not utilize sacrificial void-forming structures.

A selecting operation 1402 selects volume of getter material to be included in the getter process mixture. The getter material may include any single or combination of material known in the art suitable for chemically reacting with one or more volatile or non-volatile fission products in a nuclear reactor. In one embodiment, the getter material is provided in powder form. For example, the getter material provided in step 1402 includes, but is not limited to, a metal oxide powder. For instance, the metal oxide powder provided in step 1402 may include, but is not limited to, $ZrO_2$, $TiO_2$, $MoO_2$, $MoO_3$, $NbO_2$, $Nb_2O_5$, $Ta_2O_5$, $VO_2$, $V_2O_5$, and $Cr_2O_3$. Any of these and analogous materials have been shown to readily react with one or more volatile fission products including, but not limited to, Cs, CsBr, CsI, Rb, RbI, RbBr, or other Rb-compounds, Sr or Sr-based compounds, and iodine (and its compounds). In addition to one or more reactive materials such those described above, the getter material may also include one or more non-reactive components, such as binders and structural stabilizers.

In one embodiment, the getter material includes a metal oxide powder with a select particle size, such as an average particle size between about 100 and 500 nm. In another embodiment, the getter material includes a metal oxide powder with an average particle size at or below 100 nm. For example, the getter material may include, but is not limited to, a volume of nanopowder having an average particle size below 100 nm.

A providing operation 1404 provides a volume of void-forming structures (e.g., sacrificial void-forming structures) for combination with the getter material in the getter process mixture. In one embodiment, the void-forming structures include one or more organic materials known to undergo pyrolysis (e.g., chemical decomposition) at elevated temperature(s) in the absence of oxygen. For example, the organic materials may be selected so as to decompose at temperatures at or below an applied sintering temperature (e.g., reached during heat applied in a densifying operation 1408, described below). The organic material used to form the void-forming structures may be selected so as to breakdown at a temperature between 200 and 600° C. For instance, the void-forming structures may be formed from an organic material that decomposes at temperature below approximately 500° C. (e.g., 330-410° C.). In one embodiment, the sacrificial void-forming structures are formed from a synthetic organic material. For example, the void-forming structures may be formed from any synthetic organic material known in the art, such as, but not limited to, polyethylene (PE), polymethylmethacrylate (PMMA), polyvinyl chloride (PVC), polystyrene (PS), nylon, naphthalene and the like. In another embodiment, the void-forming structures are formed from a natural organic material. For example, the void-forming structures may be formed from any natural organic material known in the art, such as, but not limited to, gelatine, cellulose, starch, wax and the like.

In still another embodiment, the void-forming structures break down upon chemical treatment. For example, the void-forming structures may be formed from one or more water soluble ionic compounds. In one embodiment, the void-forming structures include one or more salts. For instance, the salt-based void-forming structures may include, but are not limited to, NaCl, KCl, LiCl and the like.

In another embodiment, the void-forming structures include one or more metal or ceramic compounds that react with one or more acidic leaching agents. Sacrificial templating using chemical treatment is discussed generally in H. Wang, I. Y. Sung, X. D. Li, and D. Kim, "Fabrication of Porous SiC Ceramics with Special Morphologies by Sacrificing Template Method," J. Porous Mater., 11 [4] 265-71 (2004), which is incorporated herein by reference in the entirety. Sacrificial templating using chemical treatment is also discussed generally in H. Kim, C. da Rosa, M. Boaro, J. M. Vohs, and R. J. Gorte, "Fabrication of Highly Porous Yttria-Stabilized Zirconia by Acid Leaching nickel from a Nickel-Yttria-Stabilized Zirconia Cermet," J. Am. Ceram. Soc., 85 [6] 1473-6 (2002), which is incorporated herein by reference in the entirety. Sacrificial templating using chemical treatment is also discussed generally in N. Miyagawa and N. Shinohara, "Fabrication of Porous Alumina Ceramics with Uni-Directionally-Arranged Continuous Pores Using a Magnetic Field," J. Ceram. Soc. Jpn., 107 [7] 673-7 (1999), which is incorporated herein by reference in the entirety.

In one example sacrificial templating method, a solid template is impregnated with a suspension including the getter material. The structure is solidified through one or more techniques known in the art (e.g., as explained in the above-referenced publications), and the template structure is removed, such as by acidic leaching. For example, a coral may be impregnated with hot wax, the wax may be cooled, and the coral can be leached out using a strong acidic solution.

In another embodiment, the void-forming structures include one or more solids that undergo sublimation. For example, the sacrificial void-forming structures may include any solid that readily sublimes, such as, but not limited to, naphthalene. In this regard, the one or more solid sacrificial void-forming structures may sublime out of the getter process mixture to generate a porous structure.

The void-forming structures are capable of producing a void structure with a volume sufficient to maintain a selected fission gas flow through the getter body. For example, the void-forming structures may create pores with a size distribution between 10 and 300 µm. The void-forming structures may have, but are not limited to, an average size of approximately 100 micrometer, 150 micrometer, 50 micrometer, 30 micrometer, etc., as appropriate for the determined void size. It is noted herein that the size range listed above is not a limitation on the present disclosure and is provided merely for illustrative purposes. The selected size and/or concentration of void-forming structures may depend on the desired size of voids of void-structure and the desired density of the resultant getter body. Moreover, the size of the void-forming structures may be selected so as to account for expected volumetric growth of the reactive material in the void structure.

The void-forming structures provided in the providing operation 1404 may take on any shape known in the art, including without limitation those example shapes illustrated in FIGS. 15A-15D of the present disclosure.

While much of the present disclosure focuses on solid void-forming structures, this is not a limitation on the present disclosure. Rather, it is noted herein that void-structures may also be liquid or gas form. For example, the void-forming structures may include water and oils that evaporate or sublimate out of the getter body to create void regions. In still other implementations, the void-forming structures are gaseous in form, such as gases injected into a liquid structure including the getter material (e.g., as in direct forming, a technique described below).

A forming operation 1406 forms a getter process mixture that includes both the volume of getter material and the volume of the void-forming structures. For example, the getter material and void-forming structures may be mixed in any selected proportion to achieve a desired void-structure in a resulting getter body. In one implementation, a mass ratio of getter material to void-forming structures may include, but is not limited to, a ratio between 1:1 to 3:1. For example, the getter material may be a nanopowder, and the mass ratio of the nanopowder to spherical PE void-forming structures may include, but is not limited to, one or more of the following: 1:1; 1.25:1; 1.5:1; 1.75:1; 2:1; 2.25:1; 2.50:1; 2.75:1 or 3.0:1.

In one embodiment, forming operation 1406 mixes the getter material and the void-forming structures via a wet mixing process. For example, the void-forming structures may be mixed with a solution to form a component mixture solution which in some cases may be a suspension mixture (e.g., including particles large enough to settle). Among other components, the solution may include, for example, water or alcohol (e.g., ethanol).

The forming operation 1406 may, in some implementations, entail addition of a binder agent to the mixture including the void-forming structures and getter material to aid in cohesion of the getter material and/or the forming of voids from the void-forming structures. The binder agent may include any binder agent known in the art of powder processing. For example, the binder agent may include, but is not limited to, polyethylene glycol (PEG). For instance, the mixture of step 1406 may include, but is not limited to, 1-10% binder agent by mass (e.g., 5% PEG by mass). Binder agents may be useful in both wet and dry mixing processes.

In one wet mixing process, a surfactant is added to a suspension including the getter material, void-forming structures, and a solution. The surfactant serves to aid in the dispersion of the getter material (e.g., if in powder form). In one embodiment, the surfactant is added to the solution prior to addition of the getter material and/or the sacrificial void-forming structures. The amount of surfactant added to the suspension may include, but is not limited to, 0.05 to 2% by mass (e.g., 0.1% by mass). The surfactant may include any surfactant known in the art such as, but not limited to, polyoxethlyene (20) sorbitan monooleate.

In another example wet mixing process, the getter process mixture is a suspension (e.g., getter material, sacrificial void-forming structures, and solution) and is treated with an ultrasonic bath. For example, the ultrasonic bath may be applied after addition of a binder agent and/or surfactant (e.g., as described above). The ultrasonic bath may help break up clumps of getter material powder and facilitate uniform mixing of the getter material and sacrificial void-forming structures in the solution. Additional or alternative filtering of particulate matter may be used including agitation, mesh filters, etc.

In any of the above-described embodiments including a suspension, the forming operation 1406 may further include one or more operations for drying the suspension. For example, a furnace or oven may be used to dry the suspension.

In contrast to the above-described wet-mixing and drying techniques, the forming operation 1406 may also be a dry mixing process. For example, a dry mixture including the getter material and the void-forming structures may be mixed using any mixing device known in the art, such as, but not limited to, a mixer, tumbler or the like. It is noted herein that a binder agent may also be employed in a dry mixing process. In one such implementation, a binding agent (e.g., PEG) is added to dry getter material powder and the void-forming structures in a select proportion (e.g., 1-10% binder agent by mass).

A densification operation 1408 densifies the getter process mixture. In one embodiment, the densification operations 1408 includes pressing the getter process mixture at a selected pressure to form a consolidated pellet. Although the applied pressure may vary from one implementation to another, the applied pressure is—in general—sufficient to form a self-supporting consolidated volume. In one implementation, the densification operation 1408 applies a pressure in the range of 200 to 1300 MPa (e.g., 750 MPa) to the getter process mixture.

The getter material and sacrificial void-forming structures may be consolidated using any densification device and/or technique known in the art. For example, the getter material and sacrificial void-forming structures may be pressed into a pellet using any pellet die known in the art of pellet processing. The density of the consolidated volume (e.g., the compressed getter process mixture) may be controlled by the die pressure applied to the getter process mixture and/or by the amount of void-forming structure included in the getter process mixture.

In some implementations, the densification operation 1408 entails sintering. Sintering may, for example, include heating the getter process mixture to a selected temperature for a selected time. In one implementation, the getter process mixture is heated to a temperature between about 1000 and 1500° C. and held at that temperature between 1 and 24 hours. For example, the getter process mixture may be heated to a temperature of 1350° C. and held at that temperature for 4 hours. By way of another example, the consolidate volume may be heated to a temperature of 1100° C. and held at that temperature for 8 hours. The sintering of ceramic materials is generally discussed in Borg, R. J., & Dienes, G. J., *An Introduction to Solid State Diffusion*. San Diego: Academic Press Inc. (1988), which is incorporated herein by reference in the entirety.

In some implementations, sintering of the getter process mixture can cause a thermal breakdown of the void-forming structures. Specifically, the void-forming structures may break down (e.g., undergo pyrolysis) and exit the getter body, leaving behind a solid getter body. In some implementations, sintering is carried out in an atmosphere to enhance pyrolysis of the void-forming structures. For example, the sintering step may be carried out in the presence of an atmosphere containing oxygen (e.g., air).

In some implementations that utilize sintering, the densification operation 1408 further entails applying a pre-heat treatment to the getter process mixture prior to sintering to help initiate and/or fully facilitate thermal breakdown of the void-forming structures. For example, the pre-heat treatment heats the getter process mixture to an intermediate temperature lower than a sintering temperature for a select period of time so as to fully burn out the void-forming structures prior to sintering. For instance, the getter process mixture may be heated to an intermediate temperature between 400 and 800° C. and held at that intermediate temperature for 1 to 10 hours. In one specific implementation, the consolidated volume is heated to an intermediate temperature of 500° C. for 4 hours.

In implementations that utilize heat treatment in the densification operation 1408, the temperature of the consolidated volume may be controlled at a selected ramp rate. For example, a ramp rate is selected for use during the void-forming structure burn-off process to ensure that the consolidated volume does not break apart prior to sintering. In one implementation, the temperature of the consolidated volume is ramped at a rate between 0.1 and 5° C./min, such as, but not limited to, 1° C./min.

Notably, some implementations of the disclosed technology do not include the densification operation 1408 (e.g., pressurization, heating, sintering.) For example, some void-forming structures may be capable of forming voids naturally, such as through settling. In still other implementations, the densification operation 1408 entails compaction without heating or sintering.

Various parameters of the densification operation 1408 may be selectable to control the density of the resulting getter element. For example, the ratio of the amount (by mass) of getter material to void-forming structures may be controlled so as to control the density of the consolidated volume and, thus, the densified getter element. By way of another example, the pressure applied via the densification operation 1408 may be controlled so as to control the density of the getter process mixture and the resulting getter element. Moreover, weights and sizes of the void-forming structures may be selected to form a distribution of voids describable by a particular size or shape gradient. For example, the distribution may form naturally via settling or agitation of void-forming structures of different sizes or shapes. In another embodiment, multiple layers of void-forming structures with different sizes and/or shapes are systematically created in the getter process mixture.

Figures 15A, 15B:
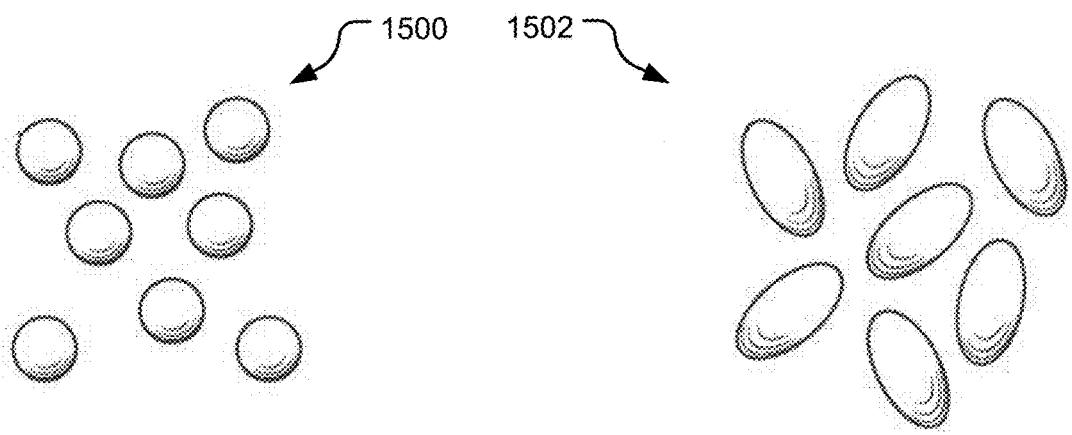
FIG. 15A illustrates an example volume of sacrificial void-forming structures that are spherical in shape.
FIG. 15B illustrates an example volume of sacrificial void-forming structures that are ellipsoidal in shape.
Figures 15C, 15D:
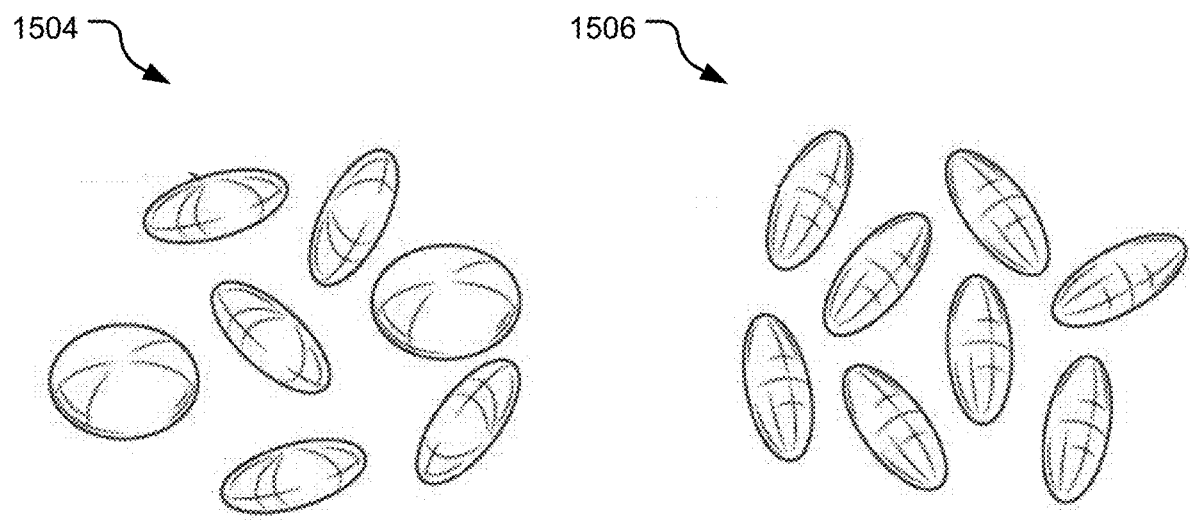
FIG. 15C illustrates an example volume of oblate-spheroid-shaped sacrificial void-forming structures.
FIG. 15D illustrates an example volume of prolate-spheroid-shaped sacrificial void-forming structures.

FIGS. 15A-15D illustrate example shapes of sacrificial void-forming structures that decompose when subjected to thermal and/or chemical treatment. The sacrificial void-forming structures of FIGS. 15A-15D are merely illustrative and non-limiting examples of structures that may be used to create "voids" in a getter body formed from a getter process mixture. Specifically, FIG. 15A illustrates an example volume of sacrificial void-forming structures 1500 that are spherical in shape (e.g., a sacrificial void-forming structure 1502). In other implementations, the sacrificial void-forming structures are shaped differently, such as ellipsoids, oblate spheroids, prolate spheroids, etc. For example, FIG. 15B illustrates the quantity 1502 of ellipsoid-shaped sacrificial void-forming structures. FIG. 15C illustrates an example volume 1504 of oblate-spheroid-shaped sacrificial void-forming structures, and FIG. 15D illustrates an example volume 1506 of prolate-spheroid-shaped sacrificial void-forming structures.

It is noted herein that spheres formed from PE having a size distribution in the range of 50 and 200 µm display adequate thermal decomposition at temperatures between 330 and 410° C. suitable for use as void-forming structures of the present disclosure.

Figure 16:
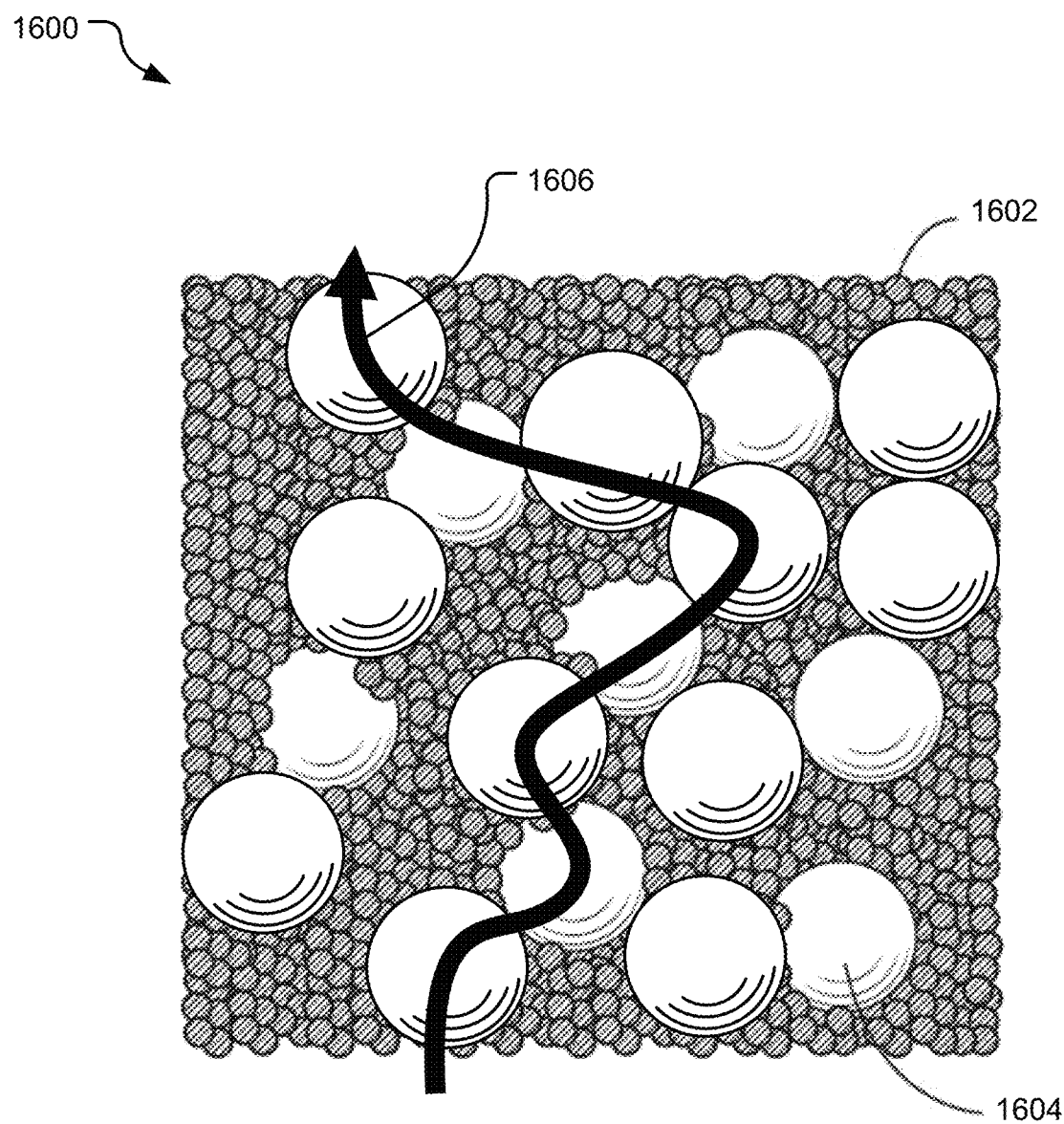
FIG. 16 illustrates a conceptual view of a portion of a consolidated volume of a getter process mixture.

FIG. 16 illustrates a conceptual view of a portion of a consolidated volume 1600 of a getter process mixture, such as that formed during the densification operation 1408 described with respect to FIG. 14. The consolidated volume is a pressurized volume including a getter material 1602 and void-forming structures 1604 that provide at least one through-channel 1606 that permits transport of a fluid flow through the volume 1600.

Figure 17:
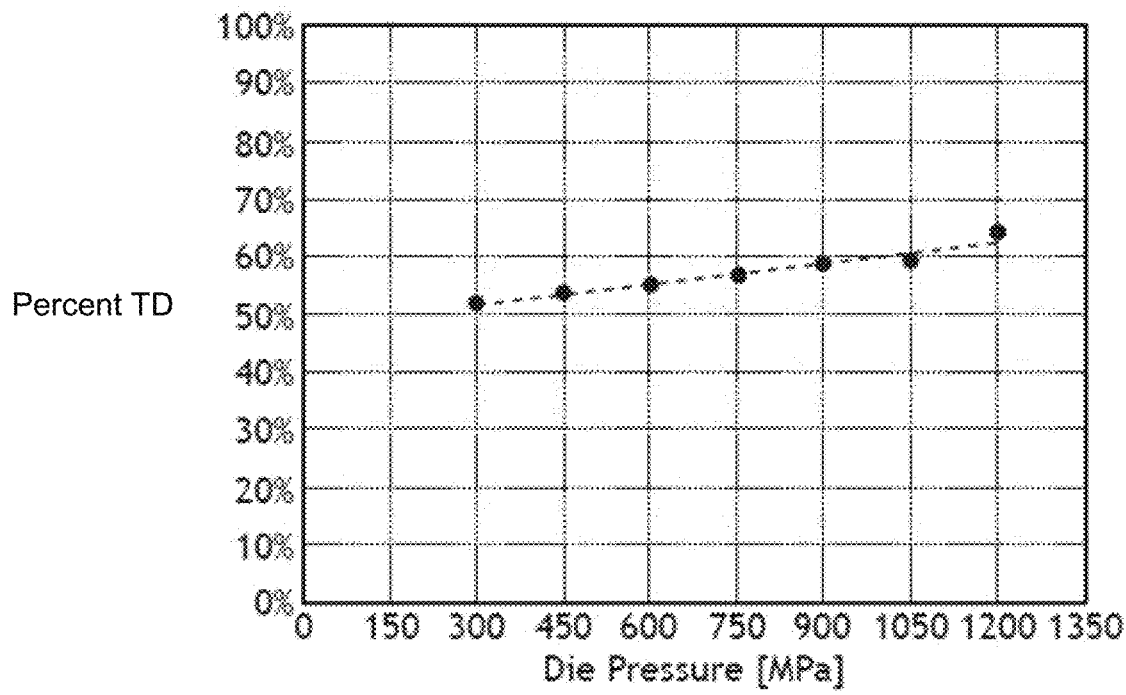
FIG. 17 illustrates graph depicting the percentage of theoretical density (TD) of a getter process mixture achieved as a function of applied die pressure.

FIG. 17 illustrates graph 1700 depicting the percentage of theoretical density (TD) of a getter process mixture achieved as a function of applied die pressure. As shown in the graph 1700, density, as expressed in terms of percent of TD, increases with increasing die pressure. In one implementation, density of a getter element is selected to balance fission product uptake in the getter element with the ability to maintain sufficient flow through the getter element. In one embodiment, the density of the fabricated getter element is between 25 and 45% TD. For example, the density of the fabricated getter element may have a density between 35 and 40% TD. In another implementation, the fabricated getter element has a density between 50-70% TD. In still another implementation, the fabricated getter element has a density between 60 and 70% TD.

Figure 18B:
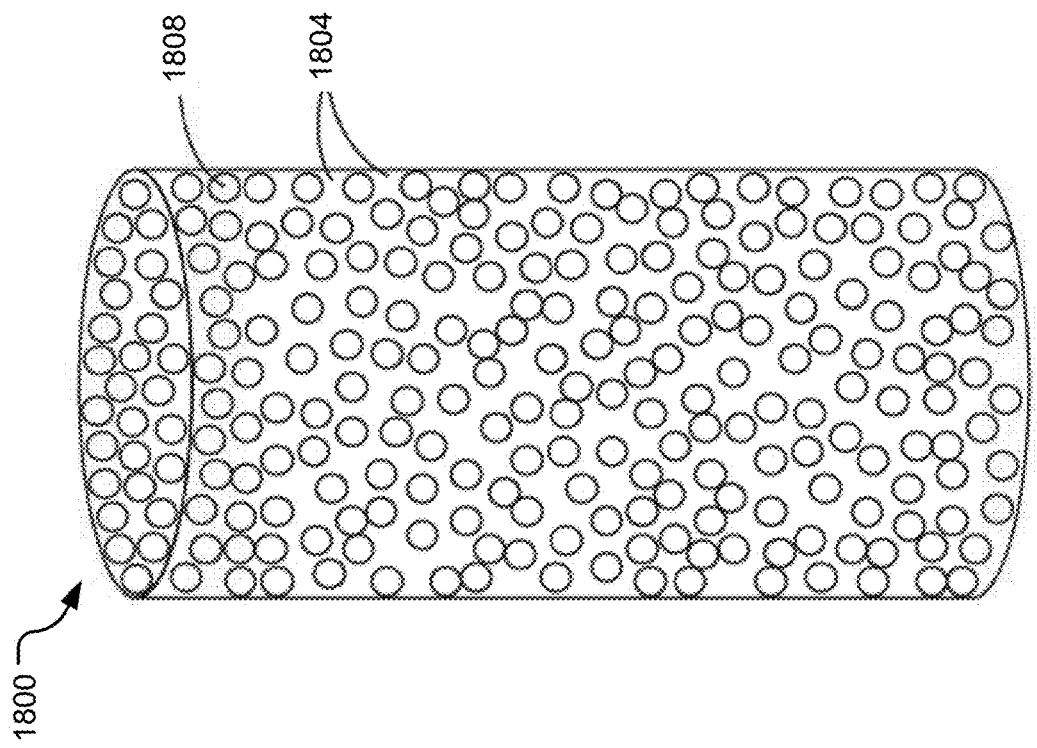
FIG. 18B illustrates the example getter body of FIG. 19A after undergoing thermal or chemical treatment that decomposes the sacrificial void-forming structures, leaving behind voids.
Figure 18A:
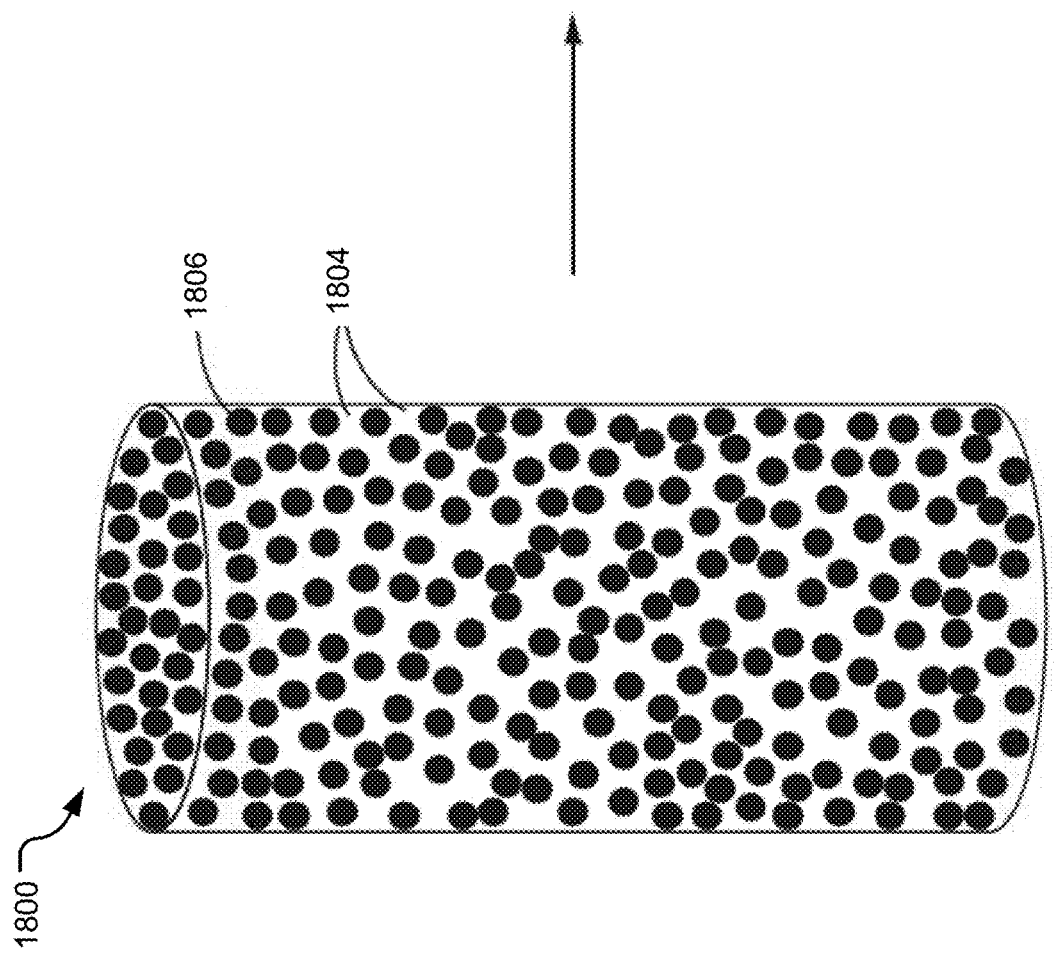
FIG. 18A illustrates an example getter body including sacrificial void-forming structures and a getter material.

FIG. 18A illustrates an example getter body 1800 including sacrificial void-forming structures 1806 intermixed with a getter material 1804. FIG. 18B illustrates the example getter body 1800 after undergoing thermal or chemical treatment that decomposes the sacrificial void-forming structures, leaving behind voids (e.g., a void 1808). In some implementations, the getter body 1800 of FIG. 18B is subjected to high pressures and heat to transform the getter body 1800 into a sintered pellet or other structure.

Figure 19A:
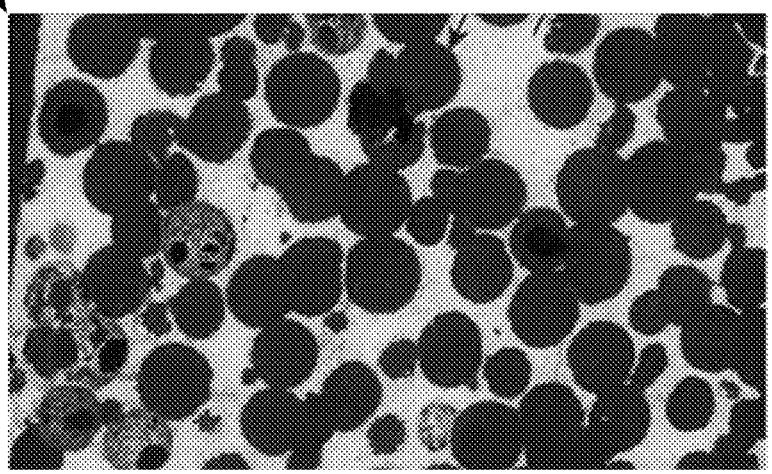
FIG. 19A illustrates a radial cross-section of the fabricated getter element and depicts a number of pores that form the overall void structure of the getter element.
Figure 19B:
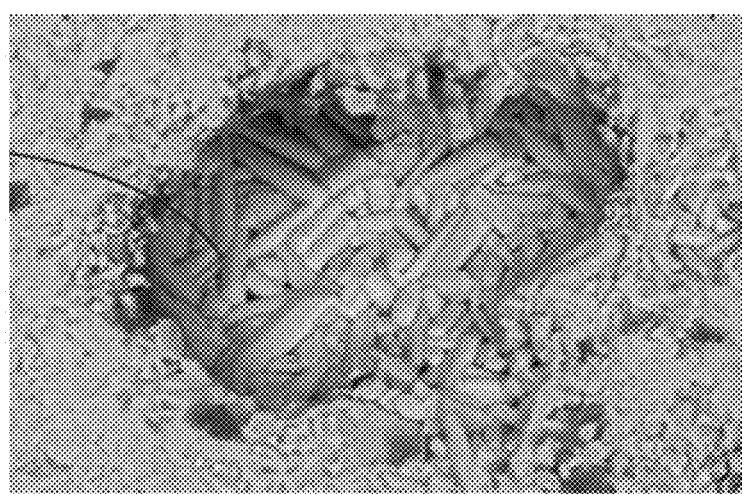
FIG. 19B illustrates a zoomed-in view of a single pore of the fabricated getter element of FIG. 20A.

FIGS. 19A and 19B illustrate scanning electron microscopy (SEM) images of the void structure of a getter element formed using spherical PE void-forming structures, in accordance within one or more embodiments of the present disclosure. More specifically, FIG. 19A illustrates a radial cross-section of the fabricated getter element and depicts a number of pores that form the overall void structure of the getter element. In one embodiment, the average pore size of the illustrated void structure is between 50 and 200 μm. For example, the void structure may have, but is not limited to, an average pore size of approximately 100-120 μm. It is to be appreciated that the void forming structures may have any appropriate size and/or shape (or even various sizes and/or shapes) as may be suitable. For example, the void forming structures may include structures having a diameter greater than 200 μm.

FIG. 19B illustrates a zoomed-in view of a single pore of the void structure and depicts the grain structure of the sintered getter material. It is noted herein that the getter element associated with the SEM images of FIGS. 19A and 19B may have a density within the ranges provided above.

Figure 20:
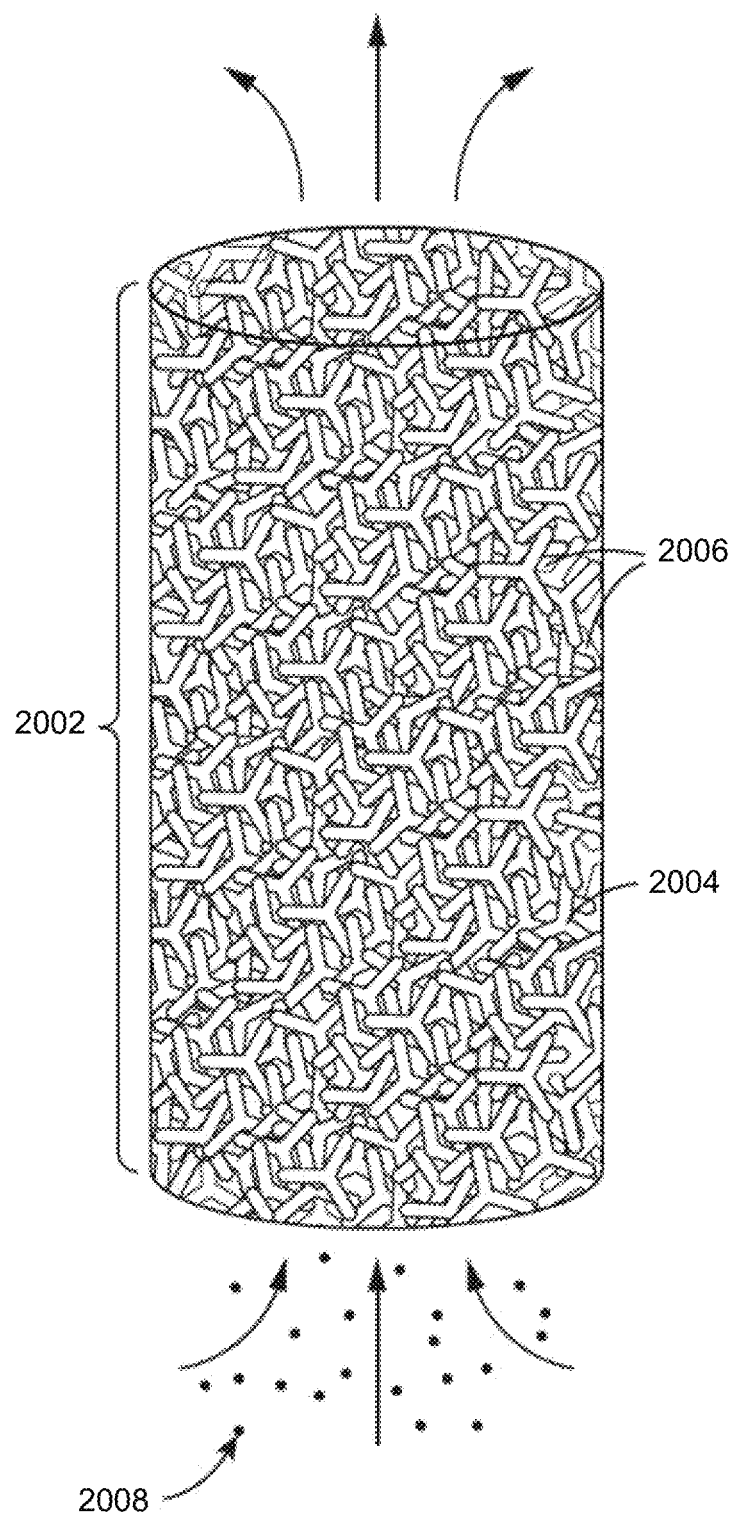
FIG. 20 illustrates a series of example additive fabrication operations for forming a getter element.

FIG. 20 illustrates a series of example additive fabrication operations 2000 for forming a getter element. Unlike the getter body forming processes described above (e.g., operations 1400 described with respect to FIG. 14), the additive fabrication process operations 2000 form a getter body without using any sacrificial void-forming structures. For example, the additive fabrication operations 2000 may entail 3D printing to create voids, such as via a selective laser sintering process.

A providing operation 2002 provides a getter material. In one embodiment, the getter material in provided in particulate form. For example, getter material may be a metal oxide powder (e.g., $ZrO_2$, $TiO_2$, $MoO_2$, $MoO_3$, $NbO_2$, $Nb_2O_5$, $Ta_2O_5$, $VO_2$, $V_2O_5$, and $Cr_2O_3$). In one embodiment, the average particle size of the getter material is between 100 and 500 nm. In another embodiment, the average particle is at or below 100 nm. It should be understood that a wide range of particle sizes, including those in excess of 500 nm, may be suitable for use in different implementations depending on the getter material and manufacturing processes employed.

An additive formation operation 2004 uses an additive manufacturing operation (e.g., 3D printing) to synthesize a free-standing three-dimensional object from the getter material. Collectively, the free-standing structures form a getter body (e.g., as shown and further described with respect to FIGS. 22-24, below). One example suitable additive manufacturing process is selective laser sintering. Selective laser sintering uses a laser to sinter powdered material by aiming and firing the laser at points in space defined by a 3D model, thereby binding material together to create a solid structure. Selective laser sintering is generally described in U.S. Pat. No. 4,863,538, filed on Oct. 17, 1986, which is incorporated above by reference in the entirety.

Elements manufactured via the example additive fabrication operations 2000 may include any micro and/or macrostructure(s) capable of maintaining the fission product uptake for the given application, which may maintain sufficient flow through a getter element. A few example getter body structures are provided in FIGS. 21-23.

Figure 21:
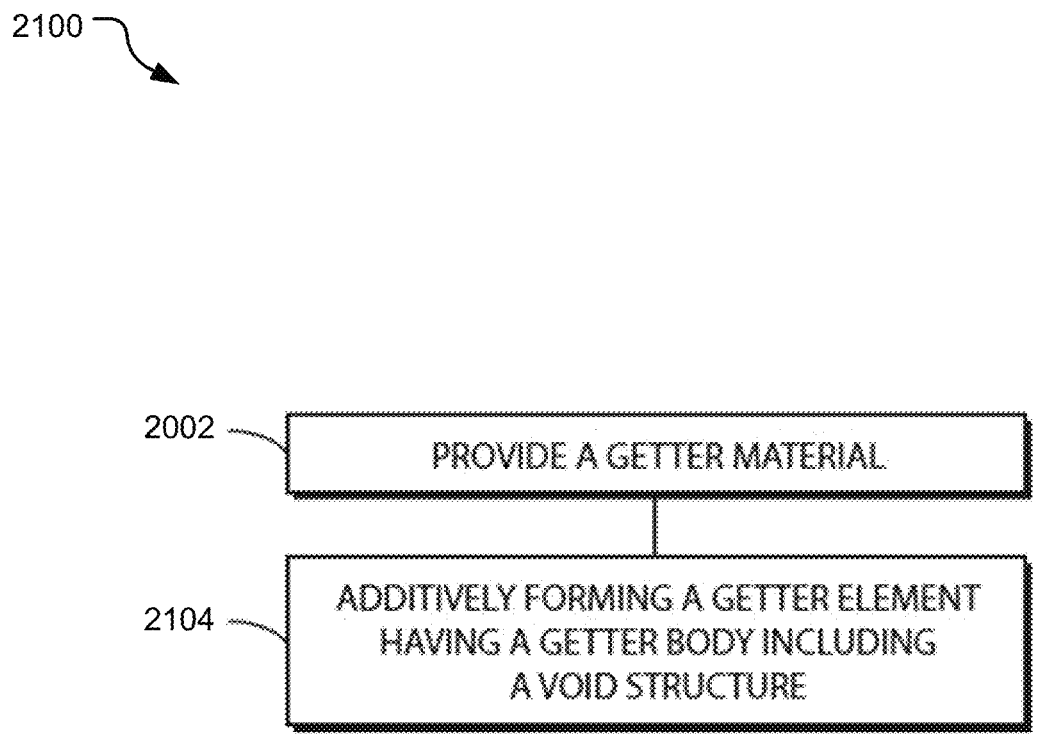
FIG. 21 illustrates an example getter body formed via an additive fabrication process.

FIG. 21 illustrates an example getter body 2102 formed via an additive fabrication (e.g., 3D printing) process. Various elements (e.g., an element 2104) of the getter body 2102 may assume different shapes and sizes in different implementation. In one implementation the elements of the getter body 2102 are not attached to one another, but rest freely within a container (e.g., a cylindrical container to create the illustrated distribution). In another implementation, the different elements are interconnected. Spaces between the different elements of the getter body 2102 create transmission channels 2106 through which fluid of an input stream 2108 may pass and come into contact with the active surface of the transmission channels within the getter body 2102.

Figure 22:
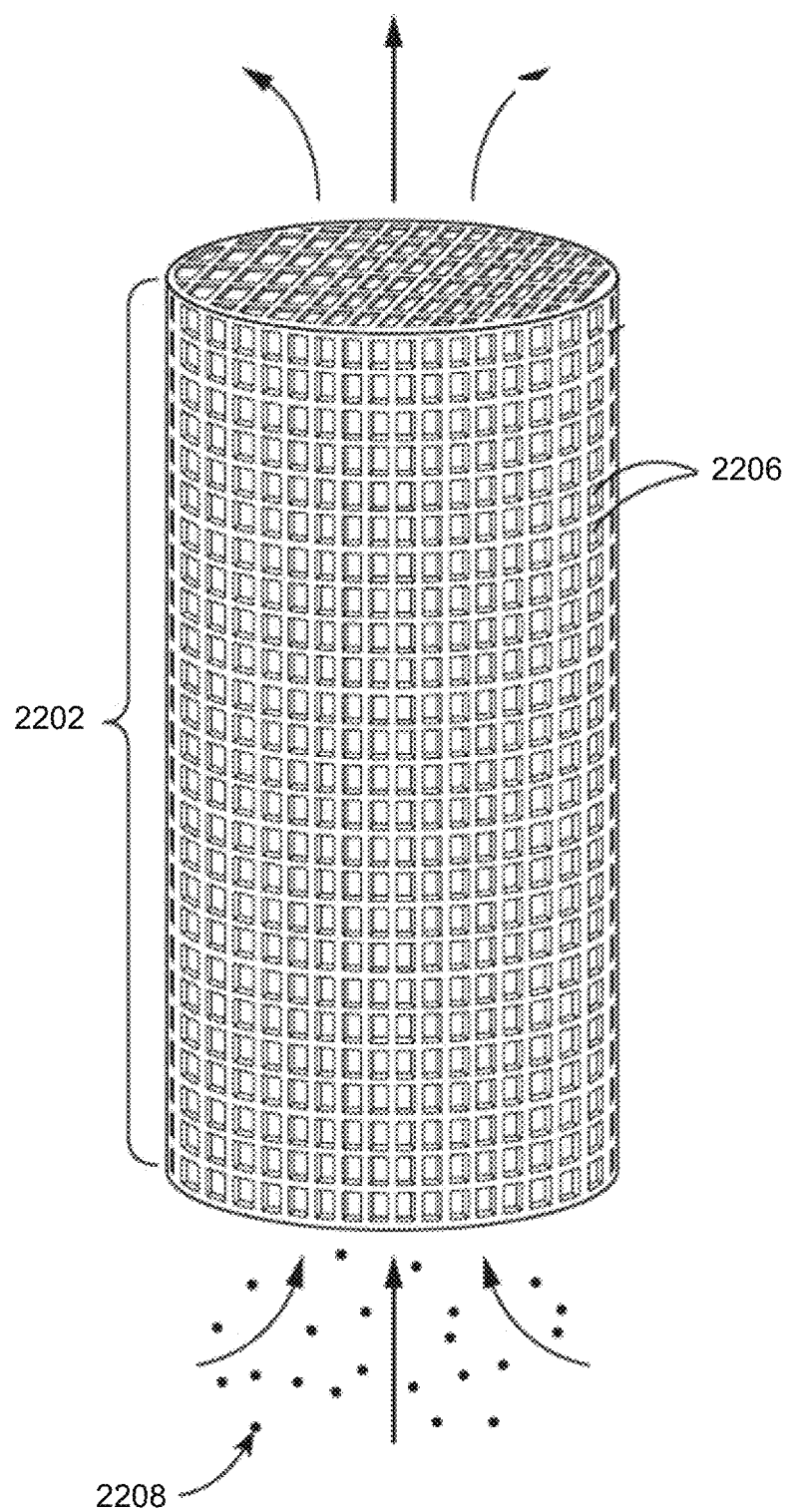
FIG. 22 illustrates another example getter body formed via an additive fabrication process.

FIG. 22 illustrates another example getter body 2202 formed via an additive fabrication (e.g., 3D printing) process. The getter body 2202 is a single, free-standing structure including rows and columns of pores 2206 to maximize surface area of contact between the getter body 2202 and an input stream 2208.

Figure 23:
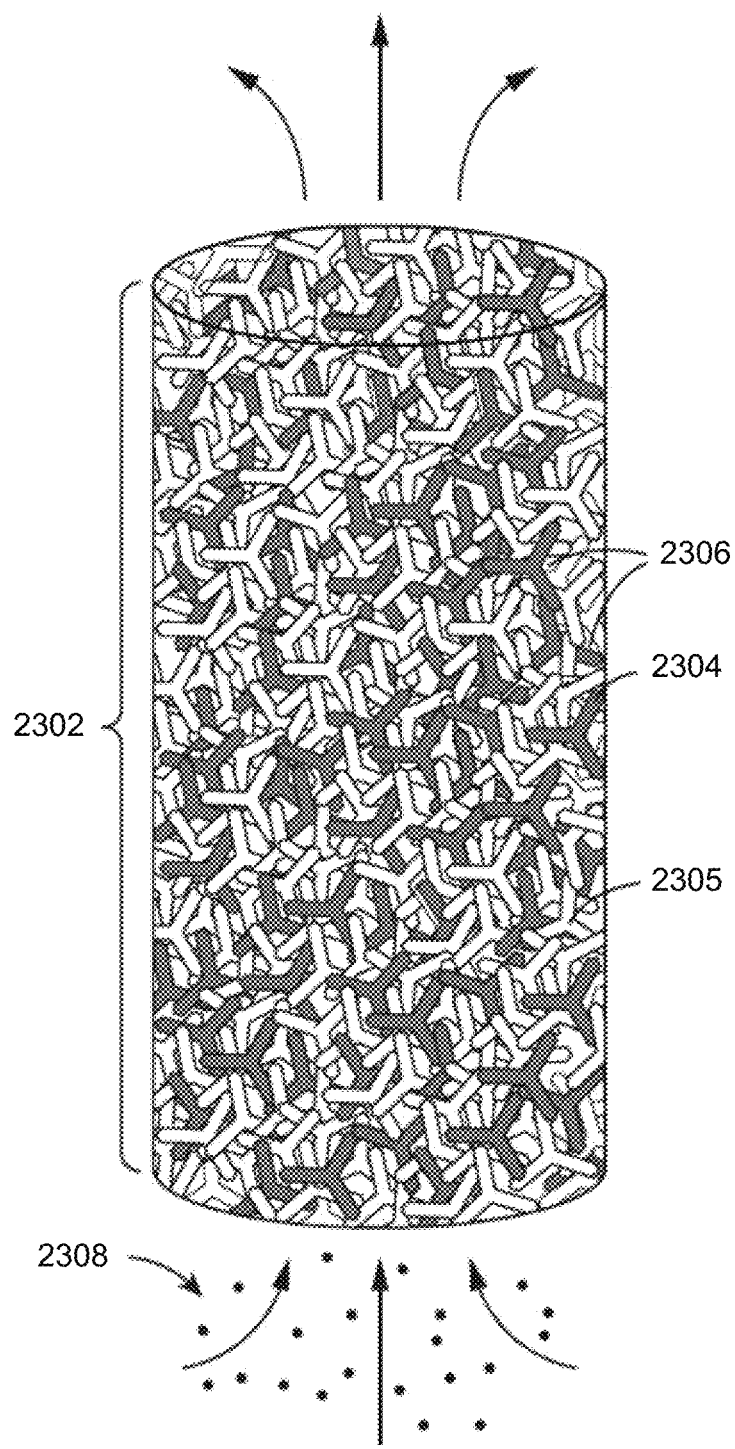
FIG. 23 illustrates yet another example getter body formed via an additive fabrication process.

FIG. 23 illustrates yet another example getter body 2302 formed via an additive fabrication process. The getter body 2302 includes a number of individual elements (e.g., an element 2304) each added to an interconnected structure via an additive fabrication process. Spaces between the different elements of the getter body 2302 create transmission channels 2306 through which gas or liquid of an input stream 2308 may pass and come into contact with surface area of the getter body 2302.

The getter body 2302 includes different elements including different getter materials, as indicated by the shading in FIG. 23. For example, a first element 2304 printed to a first portion of the getter element includes a first getter material, while a second element 2305 printed to a second portion of the getter element includes a second getter material. In this regard, two or more types of materials may be provided in the single getter body 2302, facilitating a targeted uptake of two or more types of fission products or more products from an input stream 2308. For example, the first element 2304 may include a getter material targeted for uptaking cesium, while the second element 2305 includes a getter material targeted for uptaking another element or another compound of cesium. Other getter bodies formed by similar processes may include greater than two getter elements for uptake of greater than two target fission products.

Figure 24:
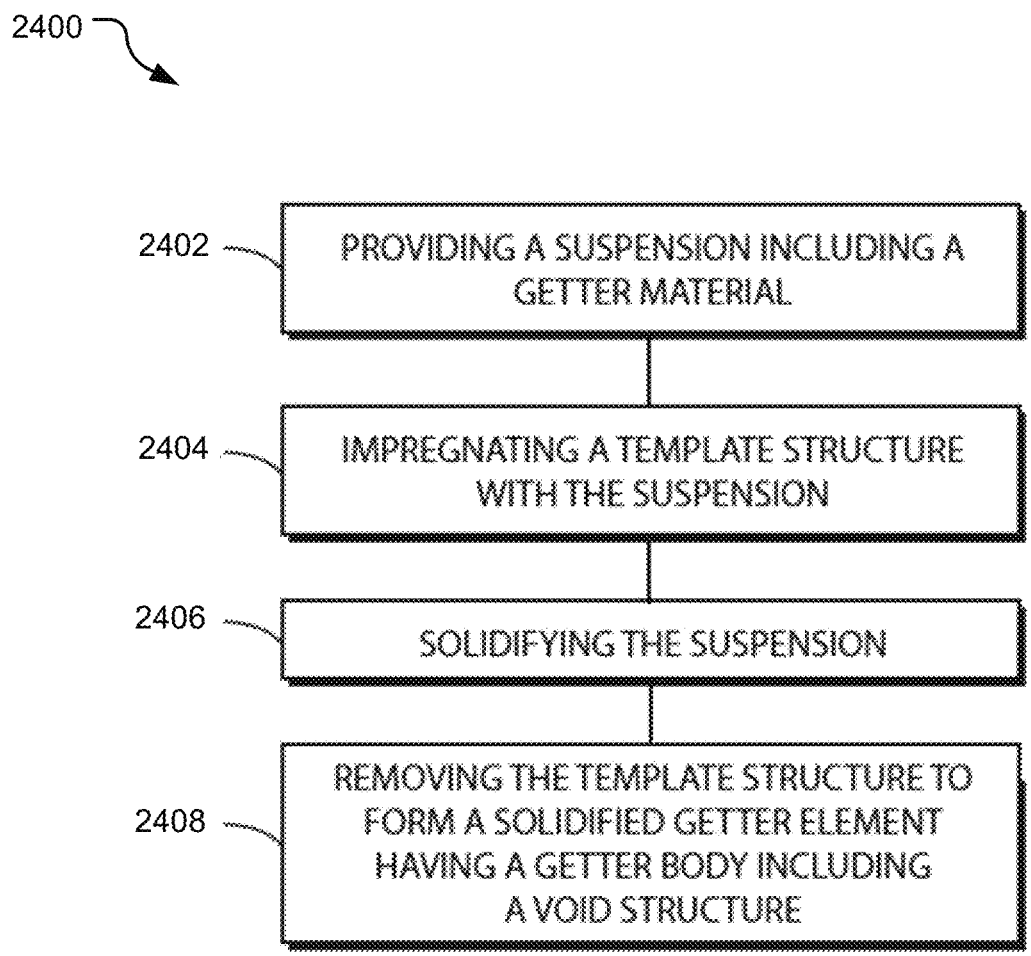
FIG. 24 illustrates example operations for forming a getter element via a sacrificial templating process.

FIG. 24 illustrates example operations 2400 for forming a getter element via a sacrificial templating process. A providing operation 2402 provides a suspension including a getter material reactive with a targeted fission product of a nuclear reaction. An impregnation operation 2404 impregnates a porous template structure with the suspension. A solidifying operation 2406 solidifies the suspension, and a removing operation 2408 removes the template structure, leaving behind a solidified getter element with a porous structure mimicking the porous template. For example, the removal operation 2408 may entail a thermal or chemical treatment that causes the porous template structure to decompose.

Figure 25:
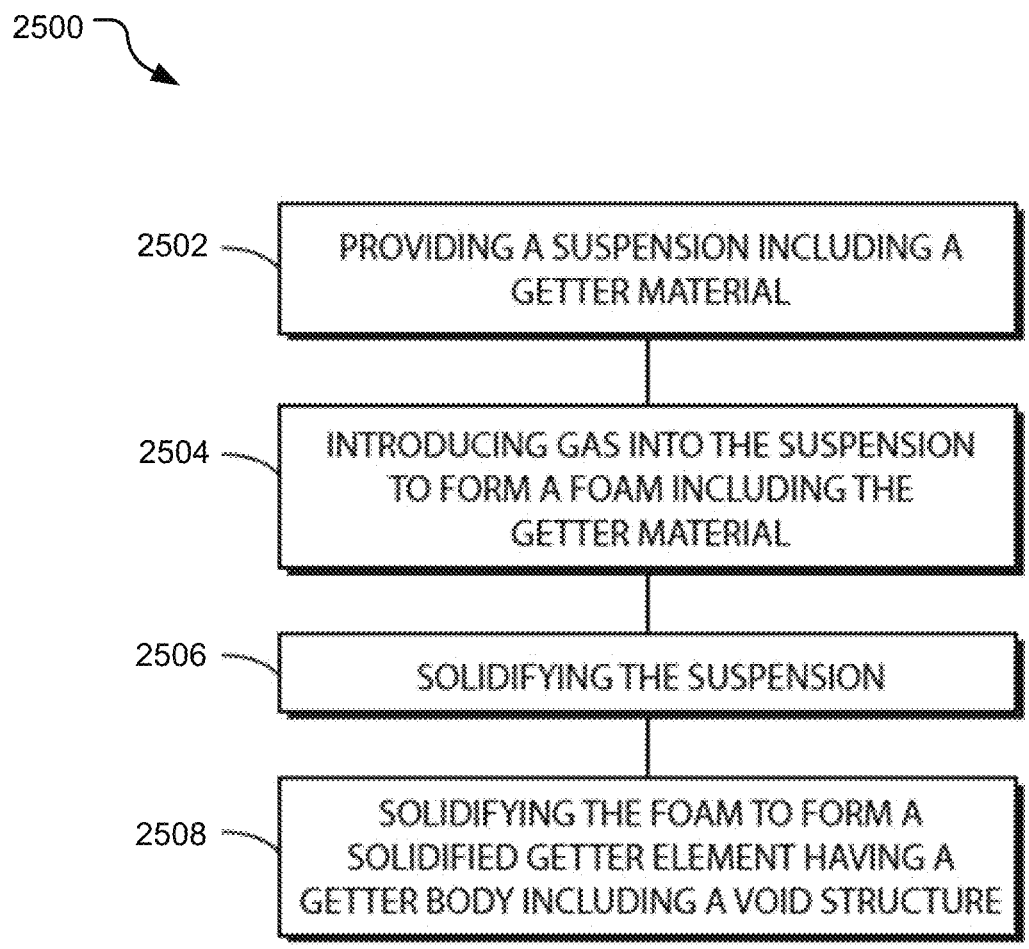
FIG. 25 illustrates example operations for forming a getter element via a direct foaming operation.

FIG. 25 illustrates example operations 2500 for forming a getter element via a direct foaming operation. A providing operation 2502 provides a suspension including a getter material reactive with a target fission product. An introduction operation 2504 introduces gas into the suspension to form a foam that includes the getter material. A first solidifying operation 2506 solidifies the suspension, and a second solidifying operation 2508 solidifies the foam to form a solidified getter element having a getter body that includes a void structure created by the gas.

The herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Furthermore, it should be understood that process operations described herein may be performed in any order, adding and omitting as desired, unless explicitly claimed otherwise or a specific order is inherently necessitated by the claim language. The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

The invention claimed is:

1. A method of forming a getter element comprising:
   determining an expected amount of fission product contained within a fluid flow of a nuclear fission reactor core over a selected period of time of operation of the nuclear fission reactor;
   identifying an expected amount of reaction product to be formed in a chemical reaction between the expected amount of the fission product and a getter material, the chemical reaction occurring over the selected period of time of operation of the nuclear fission reactor;
   determining a volume parameter of a getter process mixture including the getter material and based on the expected amount of the fission product and the expected amount of reaction product; and
   mixing the getter material and a plurality of void-forming structures to form the getter process mixture; and
   removing the plurality of void-forming structures from the getter process mixture to form a getter body with a void structure, the void structure based at least in part on the volume parameter and forming at least one through-channel through the getter body.

2. The method of claim 1, further comprising defining, based at least in part on the determined volume parameter, a surface area of the getter material sufficient to facilitate a chemical reaction between the expected amount of the fission product and the getter material to yield the expected amount of reaction product over the selected period of time of operation of the nuclear reactor.

3. The method of claim 1, wherein the fission product comprises:
   one or more of cesium and a cesium compound.

4. The method of claim 1, wherein the getter material of the getter process mixture comprises:
   a metal oxide.

5. The method of claim 4, wherein the metal oxide includes one or more of zirconium oxide, titanium oxide, molybdenum oxide, niobium oxide, tantalum oxide, vanadium oxide, and chromium oxide.

6. The method of claim 4, wherein the metal oxide has an average particle size between 100 and 500 nm.

7. The method of claim 4, wherein the metal oxide has an average particle size of less than 100 nm.

8. The method of claim 1, wherein forming the getter body comprises:
   forming a getter body having a density between 25 and 45% of a theoretical density of the getter body.

9. The method of claim 1, wherein forming the getter body comprises:
   forming a getter body having a density between 50 and 70% of a theoretical density.

10. The method of claim 1, wherein the method further comprises positioning the getter body within a porous container and positioning the porous container within a fuel pin.

11. The method of claim 10, wherein positioning the porous container within the fuel pin further comprises positioning the porous container in a location within the fuel pin such that substantially all of a fission product source in the fuel pin is on a first side of the getter body within the fuel pin.

12. The method of claim 10, wherein the fuel pin is configured to vent gasses produced within the fuel pin to headspace of a nuclear reactor.

13. The method of claim 1, wherein the getter process mixture includes a first getter material to facilitate a reaction with a first fission product of the fluid flow and also includes a second getter material for reacting with a second fission product in the fluid flow.

14. The method of claim 1, wherein removing the plurality of void-forming structures from the getter process mixture further comprises:
   adding a solvent to the getter process mixture to dissolve the plurality of void-forming structures.

15. The method of claim 1, wherein the void-forming structures are formed from an organic material.

16. The method of claim 1, wherein the void-forming structures have an average size between 50-150 microns.

17. The method of claim 1, wherein determining the volume parameter includes determining a mass ratio of the getter material to void-forming structures between 1:1 to 3:1.

18. The method of claim 1, wherein forming the getter body includes densifying the getter process mixture.

19. The method of claim 18 wherein densifying the getter process mixture includes pressing the getter process mixture at a selected pressure between about 200 and about 1300 MPa.

* * * * *